US008237765B2

(12) United States Patent
King et al.

(10) Patent No.: US 8,237,765 B2
(45) Date of Patent: Aug. 7, 2012

(54) VIDEO CONFERENCING DEVICE WHICH PERFORMS MULTI-WAY CONFERENCING

(75) Inventors: Keith C. King, Austin, TX (US); Wayne E. Mock, Round Rock, TX (US)

(73) Assignee: LifeSize Communications, Inc., Austin, TX (US)

( * ) Notice: Subject to any disclaimer, the term of this patent is extended or adjusted under 35 U.S.C. 154(b) by 1084 days.

(21) Appl. No.: 12/142,340

(22) Filed: Jun. 19, 2008

(65) Prior Publication Data

US 2008/0316297 A1    Dec. 25, 2008

Related U.S. Application Data

(60) Provisional application No. 60/945,734, filed on Jun. 22, 2007, provisional application No. 60/945,723, filed on Jun. 22, 2007, provisional application No. 60/949,674, filed on Jul. 13, 2007.

(51) Int. Cl.
*H04M 11/00* (2006.01)
(52) U.S. Cl. ..................... 348/14.01; 709/204
(58) Field of Classification Search ...... 348/14.01–14.9, 348/14.11, E7.084, E7.83
See application file for complete search history.

(56) References Cited

U.S. PATENT DOCUMENTS

| | | | |
|---|---|---|---|
| 4,686,698 A | 8/1987 | Tompkins et al. |
| 4,893,326 A | 1/1990 | Duran et al. |
| 5,014,267 A | 5/1991 | Tompkins et al. |
| 5,239,623 A | 8/1993 | Sato et al. |
| 5,365,265 A | 11/1994 | Shibata et al. |
| 5,374,952 A | 12/1994 | Flohr |
| 5,382,972 A | 1/1995 | Kannes |
| 5,398,309 A | 3/1995 | Atkins et al. |
| 5,453,780 A | 9/1995 | Chen et al. |
| 5,515,099 A | 5/1996 | Cortjens et al. |
| 5,528,740 A | 6/1996 | Hill et al. |
| 5,534,914 A | 7/1996 | Flohr et al. |

(Continued)

FOREIGN PATENT DOCUMENTS

JP    5181639    7/1993

OTHER PUBLICATIONS

"Eye-to-Eye Video"; Retrieved from the Internet: http://itotd.com/articles/254/eye-to-eye-video/; Jul. 23, 2004; 6 pages.

(Continued)

*Primary Examiner* — Curtis Kuntz
*Assistant Examiner* — Maria El-Zoobi
(74) *Attorney, Agent, or Firm* — Meyertons Hood Kivlin Kowert & Goetzel, P.C.; Jeffrey C. Hood

(57) ABSTRACT

In various embodiments, a video conferencing device (e.g., an endpoint) may generate a video frame that includes video images of two or more video conferencing endpoints. The video frame may then be sent to a video conferencing device that may receive the video frame and separate the two or more video images into separate video images. In some embodiments, coordinate information sent along with the video frame (e.g., in metadata) may be used by the video conferencing endpoint to determine the locations of the video images in the video frame to facilitate separation of the video images. By transmitting and receiving video frames with multiple video images (from different video conferencing endpoints), multiple video conferencing endpoints can implement a multi-way video conference call without using an MCU.

20 Claims, 19 Drawing Sheets

U.S. PATENT DOCUMENTS

| | | | |
|---|---|---|---|
| 5,537,440 A | 7/1996 | Eyuboglu et al. | |
| 5,548,591 A * | 8/1996 | Horikoshi | 370/260 |
| 5,572,248 A | 11/1996 | Allen et al. | |
| 5,581,671 A | 12/1996 | Goto et al. | |
| 5,594,859 A | 1/1997 | Palmer et al. | |
| 5,600,646 A | 2/1997 | Polomski | |
| 5,617,539 A | 4/1997 | Ludwig et al. | |
| 5,625,410 A | 4/1997 | Washino et al. | |
| 5,629,736 A | 5/1997 | Haskell et al. | |
| 5,640,543 A | 6/1997 | Farrell et al. | |
| 5,649,055 A | 7/1997 | Gupta et al. | |
| 5,657,096 A | 8/1997 | Lukacs | |
| 5,684,527 A | 11/1997 | Terui et al. | |
| 5,689,641 A | 11/1997 | Ludwig et al. | |
| 5,719,951 A | 2/1998 | Shackleton et al. | |
| 5,737,011 A | 4/1998 | Lukacs | |
| 5,751,338 A | 5/1998 | Ludwig, Jr. | |
| 5,764,277 A | 6/1998 | Loui et al. | |
| 5,767,897 A | 6/1998 | Howell | |
| 5,812,789 A | 9/1998 | Diaz et al. | |
| 5,821,986 A | 10/1998 | Yuan et al. | |
| 5,828,838 A * | 10/1998 | Downs et al. | 709/204 |
| 5,831,666 A | 11/1998 | Palmer et al. | |
| 5,838,664 A | 11/1998 | Polomski | |
| 5,841,763 A | 11/1998 | Leondires et al. | |
| 5,859,979 A | 1/1999 | Tung et al. | |
| 5,870,146 A | 2/1999 | Zhu | |
| 5,896,128 A | 4/1999 | Boyer | |
| 5,900,907 A | 5/1999 | Malloy et al. | |
| 5,914,940 A | 6/1999 | Fukuoka et al. | |
| 5,990,931 A | 11/1999 | Nimri et al. | |
| 5,995,608 A | 11/1999 | Detampel, Jr. et al. | |
| 6,038,532 A | 3/2000 | Kane et al. | |
| 6,043,844 A | 3/2000 | Bist et al. | |
| 6,049,694 A | 4/2000 | Kassatly | |
| 6,078,350 A | 6/2000 | Davis | |
| 6,101,480 A | 8/2000 | Conmy et al. | |
| 6,122,668 A | 9/2000 | Teng et al. | |
| 6,128,649 A | 10/2000 | Smith et al. | |
| 6,160,573 A | 12/2000 | Allen et al. | |
| 6,195,184 B1 | 2/2001 | Chao et al. | |
| 6,243,129 B1 | 6/2001 | Deierling | |
| 6,281,882 B1 | 8/2001 | Gordon et al. | |
| 6,285,661 B1 | 9/2001 | Zhu et al. | |
| 6,288,740 B1 | 9/2001 | Lai et al. | |
| 6,292,204 B1 | 9/2001 | Carleton et al. | |
| 6,300,973 B1 * | 10/2001 | Feder et al. | 348/14.09 |
| 6,314,211 B1 | 11/2001 | Kim et al. | |
| 6,373,517 B1 | 4/2002 | Davis et al. | |
| 6,400,996 B1 | 6/2002 | Hoffberg et al. | |
| 6,453,285 B1 | 9/2002 | Anderson et al. | |
| 6,480,823 B1 | 11/2002 | Zhao et al. | |
| 6,496,216 B2 | 12/2002 | Feder et al. | |
| 6,526,099 B1 | 2/2003 | Christopoulos et al. | |
| 6,535,604 B1 | 3/2003 | Provencal et al. | |
| 6,564,380 B1 | 5/2003 | Murphy | |
| 6,590,604 B1 | 7/2003 | Tucker et al. | |
| 6,594,688 B2 | 7/2003 | Ludwig et al. | |
| 6,603,501 B1 | 8/2003 | Parry et al. | |
| 6,646,997 B1 | 11/2003 | Baxley et al. | |
| 6,654,045 B2 | 11/2003 | Allen et al. | |
| 6,657,975 B1 | 12/2003 | Baxley et al. | |
| 6,728,221 B1 | 4/2004 | Shaffer et al. | |
| 6,744,460 B1 | 6/2004 | Nimri et al. | |
| 6,757,005 B1 | 6/2004 | Elbaz et al. | |
| 6,760,415 B2 | 7/2004 | Beecroft | |
| 6,774,928 B2 | 8/2004 | Bruzzone | |
| 6,813,083 B2 | 11/2004 | Kobayashi | |
| 6,816,904 B1 | 11/2004 | Ludwig et al. | |
| 6,847,403 B1 | 1/2005 | Forsberg, Jr. et al. | |
| 6,909,552 B2 | 6/2005 | Dohi et al. | |
| 6,944,259 B2 | 9/2005 | Yang | |
| 6,967,321 B2 | 11/2005 | Leong et al. | |
| 7,089,285 B1 | 8/2006 | Drell | |
| 7,133,062 B2 | 11/2006 | Castles et al. | |
| 7,312,809 B2 | 12/2007 | Bain et al. | |
| 7,339,605 B2 | 3/2008 | Rodman et al. | |
| 8,027,538 B1 * | 9/2011 | Peterson | 382/181 |
| 2002/0133247 A1 | 9/2002 | Smith et al. | |
| 2002/0188731 A1 | 12/2002 | Potekhin et al. | |
| 2003/0174146 A1 | 9/2003 | Kenoyer | |
| 2003/0232648 A1 | 12/2003 | Prindle | |
| 2004/0183897 A1 | 9/2004 | Kenoyer et al. | |
| 2005/0198134 A1 | 9/2005 | Kenoyer et al. | |
| 2006/0013416 A1 | 1/2006 | Truong et al. | |
| 2006/0087553 A1 | 4/2006 | Kenoyer | |
| 2006/0244817 A1 | 11/2006 | Harville et al. | |
| 2006/0259552 A1 | 11/2006 | Mock | |
| 2006/0277254 A1 | 12/2006 | Kenoyer et al. | |
| 2007/0009113 A1 | 1/2007 | Kenoyer | |
| 2007/0009114 A1 | 1/2007 | Kenoyer et al. | |
| 2007/0165106 A1 | 7/2007 | Groves et al. | |

OTHER PUBLICATIONS

"Free2C 3D-Display" (web archive: http://www.hhi.fraunhofer.de/english/im/products/Cebit/free2C/free2C.html dated Nov. 22, 2005); Fraunhofer Institute for Telecommunications; 4 pages.

"Guide to Videoconferencing"; 2005; 119 pages; University of Malta.

"MacSpeech Certifies Voice Tracker™ Array Microphone"; Apr. 20, 2005; 2 pages; MacSpe ech Press.

Ronald Baecker, Ian Small, and Richard Mander; "Bringing Icons to Life"; Conference on Human Factors in Computing Systems; 1991; 6 pages.

N. A. Dodgson, N.E. Wiseman, S.R. Lang, D.C. Dunn, and A.R.L. Travis; "Autostereoscopic 3D Display in Laparoscopic Surgery"; Jun. 1995; 5 pages; CAR '95 (Computer Assisted Radiology), Berlin.

Neil A. Dodgson, John R. Moore, and Stewart R. Lang; "Time-Multiplexed Autostereoscopic Camera System"; Proceedings of The International Society for Optical Engineering; May 1997; p. 12.

Jefferson Han and Brian Smith; "CU-SeeMe VR Immersive Desktop Teleconferencing"; Proceeding of the Fourth ACM international conference on Multimedia; 1997; pp. 199-207.

David McAllister; "Display Technology: Stereo & 3D Display Technologies" North Carolina State University, http://web.archive.org/web/20031206213341/http://research.csc.ncsu.edu/stereographics/wiley.pdf (date or web archive Dec. 6, 2003); 50 pages.

Alexander Sawchuk, Isaac Cohen, Chris Kyriakakis, and Albert Rizzo; "Three Dimensional Interaction with Autostereoscopic Displays" (date unknown); 8 pages.

Lars Weinand; "3D Stereo Technology: Is it Ready for Prime Time?"; http://www.tomshardware.com/2005/05/02/3d_stereo_technology; May 2, 2005; 40 pages.

"Technical Handbook"; North Dakota Interactive Video Network; Jan. 2003; 38 pages.

"A history of video conferencing (VC) technology" http://web.archive.org/web/20030622161425/http://myhome.hanafos.com/~soonjp/vchx.html (web archive dated Jun. 22, 2003); 5 pages.

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System"; Multimedia '02; Dec. 2002; 10 pages; Microsoft Research; Redmond, WA.

P. H. Down; "Introduction to Videoconferencing"; http://www.video.ja.net/intro/; 2001.

Louis C. Yun and David G. Messerschmitt; "Architectures for Multi-Source Multi-User Video Compositing"; 1993; 9 pages; University of California at Berkley, Berkley CA.

"Polycom VideoPlus Continuous Presence"; Brochure; 2004; 3 pages; Pleasanton, CA.

Peter Klein; "Video Workplace Conference"; IEEE Proceedings of Globecom; 1985; pp. 109-112; Siemens AG, Germany.

"Videoconferencing Educational Technology—Basic Functions of the Polycom Remote Control Unit"; http://www.medlib.iupui.edu/techsupport/vc/vcinstructions.html; 2002; 3 pages.

E. J. Addeo, A. D. Gelman and A. B. Dayao; "A Multi-media Multipoint Communication Services Capability for Broadband Networks"; Mar. 1987; pp. 423-428; Bell Communications Research; Morristown, NJ.

U.S. Appl. No. 12/142,263, entitled "Virtual decoders", by King, et al., filed on Jun. 19, 2008.

U.S. Appl. No. 12/142,302, entitled "Video Conferencing System which Allows Endpoints to Perform Continuous Presence Layout Selection", by King, et al., filed on Jun. 19, 2008.

U.S. Appl. No. 12/142,377, entitled "Video Decoder which Processes Multiple Video Streams", by King, et al., filed on Jun. 19, 2008.

U.S. Appl. No. 12/171,358, entitled "Virtual Multiway Scaler Compensation", by King, et al., filed on Jul. 11, 2008.

E. F. Brown, J. O. Limb and B. Prasada; "A Continuous Presence Video Conferencing System"; National Telecommunications Conference Record; Dec. 1978; 5 pages; vol. 1.

Armando Fox, Steven D. Gribble, Eric A. Brewer, and Elan Amir; "Adapting to Network and Client Variability via On-Demand Dynamic Distillation" Proceedings of the seventh international conference on Architectural support for programming languages and operating systems;1996; pp. 160-170.

Robert D. Gaglianello and Glenn L. Cash; "Montage: Continuous Presence Teleconferencing Utilizing Compressed Domain Video Bridging"; IEEE International Conference on Communication; Jun. 1995; pp. 572-581; AT&T Bell Laboratories.

A.B. Larsen and E.F. Brown; "'Continuous Presence' Video Conferencing at 1.5-6 Mb/sec"; Teleconferencing and Interactive Media, University of Wisconsin Extension Center for Interactive Programs; 1980; 8 pages.

Michael E. Lukacs; "The Personal Presence System—Hardware Architecture", Proceedings of the Second ACM International Conference on Multimedia; Oct. 1994; pp. 69-76; Bell Communications Research.

Shigeki Masaki, Hiroyuki Yamaguchi Hideya Ichihara and Kazunori Shimamura; "A Desktop Teleconferencing Terminal Based on B-ISDN: PMTC"; NTT Review; Jul. 1992; pp. 81-85; vol. 4, No. 4.

Shaker Sabri and Birendra Prasada; "Video Conferencing Systems"; Proceedings of the IEEE; Apr. 1985; pp. 671-688; vol. 74, Issue 4.

Christoph Weiss; "Desk Top Video Conferencing—An Important Feature of Future Visual Communications"; IEEE International Conference on Communications; Apr. 1990; pp. 134-139; vol. 1.

Marc H. Willebeek-Lemair and Zon-Yin Shae; "Videoconferencing over Packet-Based Networks" IEEE Journal on Selected Ares in Communications; Aug. 1997; 1101-1114; vol. 15, No. 6.

Elan Amir, Steven McCanne, and Hui Zhang; "An Application Level Video Gateway"; In Proceedings of ACM Multimedia '95; 1995; 18 pages.

Horng-Dar Lin and David G. Messerschmitt; "Video Composition Methods and Their Semantics"; International Conference on Acoustics, Speech, and Signal Processing; Apr. 1991; pp. 2833-2836; vol. 4.

"Polycom Executive Collection"; Jun. 2003; 4 pages; Polycom, Inc.; Pleasanton, CA.

Joe Duran and Charlie Sauer; "Mainstream Videoconferencing—A Developer's Guide to Distance Multimedia"; Jan. 1997; pp. 50-52; Addison Wesley Longman, Inc.

E. J. Addeo, A.D. Gelman and A.B. Dayao; "Personal Multi-media Multi-point Communication Services for Broadband Networks", Global Telecommunications Conference and Exhibition; Nov.-Dec. 1988; pp. 53-57; vol. 1.

Joe W. Duran and Michael Kenoyer; "A PC-compatible, multiprocessor workstation for video, data, and voice communication"; Proceedings of SPIE, Visual Communications and Image Processing IV; Nov. 1989; pp. 232-236; VideoTelecom Corp.

Aurel Lazar, Koon-Seng Lim and Franco Marconcini; "Realizing a Foundation for Programmability of ATM Networks with the Binding Architecture"; IEEE Journal on Selected Areas in Communications; Sep. 1996; pp. 1214-1227; vol. 14, No. 7.

Aurel A. Lazar, Koon-Seng Lim and Franco Marconcini; "xbind: The System Programmer's Manual"; Technical Report; Jun. 1996; 69 pages; Center for Telecommunications Research; Columbia University, New York.

Shigeki Masaki, Hiroyuki Yamaguchi, Yasuhito Hayashi, Takashi Nishimura, and Kazunori Shimamura; "Multimedia Handling Scheme in a Groupware System for B-ISDN"; IEEE Global Telecommunications Conference; Dec. 1992; pp. 747-751; NTT Human Interface Labs.

Aurel A. Lazar and Koon-Seng Lim; "Programmability and Service Creation for Multimedia Networks"; Fifth IEEE International Symposium on High Performance Distributed Computing; 1996; pp. 217-223.

\* cited by examiner

VIDEO CONFERENCING DEVICE WHICH PERFORMS MULTI-WAY CONFERENCING

PRIORITY

This application claims the benefit of priority of U.S. Provisional Patent Application Ser. No. 60/945,734 titled "Videoconferencing Device which Performs Multi-way Conferencing", filed on Jun. 22, 2007, whose inventors are Keith C. King and Wayne E. Mock, which is hereby incorporated by reference in its entirety as though fully and completely set forth herein.

This application also claims the benefit of priority of U.S. Provisional Patent Application Ser. No. 60/945,723 titled "Virtual Decoders", filed on Jun. 22, 2007, whose inventors are Keith C. King and Wayne E. Mock, which is hereby incorporated by reference in its entirety as though fully and completely set forth herein.

This application also claims the benefit of priority of U.S. Provisional Patent Application titled "Virtual Multiway Scaler Compensation", Ser. No. 60/949,674, which was filed Jul. 13, 2007, whose inventors are Keith C. King and Wayne E. Mock, which is hereby incorporated by reference in its entirety as though fully and completely set forth herein.

BACKGROUND OF THE INVENTION

1. Field of the Invention

The present invention relates generally to conferencing and, more specifically, to video conferencing.

2. Description of the Related Art

Video conferencing may be used to allow two or more participants at remote locations to communicate using both video and audio. Each participant location may include a video conferencing endpoint for video/audio communication with other participants. Each video conferencing endpoint may include a camera and microphone to collect video and audio from a first or local participant to send to another (remote) participant. Each video conferencing endpoint may also include a display and speaker to reproduce video and audio received from a remote participant. Each video conferencing endpoint may also be coupled to a computer system to allow additional functionality into the video conference. For example, additional functionality may include data conferencing (including displaying and/or modifying a document for two or more participants during the conference).

Video conferencing involves transmitting video streams between video conferencing endpoints. The video streams transmitted between the video conferencing endpoints may include video frames. The video frames may include pixel macroblocks that may be used to construct video images for display in the video conferences. Video frame types may include intra-frames, forward predicted frames, and bi-directional predicted frames. These frame types may involve different types of encoding and decoding to construct video images for display. Currently, in a multi-way video conference call, a multipoint control unit (MCU) is required to composite video images received from different video conferencing endpoints onto video frames of a video stream that may be encoded and transmitted to the various video conferencing endpoints for display.

SUMMARY OF THE INVENTION

In various embodiments, a video conferencing device (e.g., an endpoint) may generate a video frame that includes video images of two or more video conferencing endpoints. The video frame may then be sent to a video conferencing device that may receive the video frame and separate the two or more video images into separate video images. By transmitting and receiving video frames with multiple video images (from different video conferencing endpoints), multiple video conferencing endpoints may implement a multi-way video conference call without using an MCU. In some embodiments, coordinate information sent along with the video frame (e.g., in metadata) may be used by the video conferencing endpoints to determine the locations of the video images in the video frame to facilitate separation of the video images. The metadata may include video image identifiers and location information (e.g., coordinates in the video frame) of the video images.

In some embodiments, the separated video images may be provided to a compositor that may composite the separated video images into a new video image layout. Other video images (e.g., from local video or received from other video conferencing endpoints) may also be composited into the new video image layout. In some embodiments, the new video image layout may be configured to be displayed (e.g., as a continuous presence image). In some embodiments, participants at each video conferencing endpoint may use their local video conferencing endpoints to customize their continuous presence layout. For example, participants may rearrange the video images and/or replace one or more video images in the video image layout (e.g., with a current video image from their local video source).

In some embodiments, a spatially multiplexed output decoder may spatially multiplex video packets received in a time multiplexed video stream. A video stream with video packets from two or more sources may be received along with metadata (e.g., with identifying information for the video packets). In some embodiments, a decoder may organize the video packets into respective buffers (e.g., each buffer including video packets for a respective video image). In some embodiments, the spatially multiplexed output decoder may spatially multiplex the video images (which are made up of data from the respective video packets) into a video frame to be outputted (e.g., to a separate buffer). The video images in the video frame may then be demultiplexed in other parts of the system (e.g., in a virtual decoder) using information provided about the video frame (e.g., in metadata formed with the video frame). These stacked images may be disassembled as needed to assemble different composite layouts for display and/or to transmit to a different endpoint for facilitating a multi-way conference.

Figure 1:
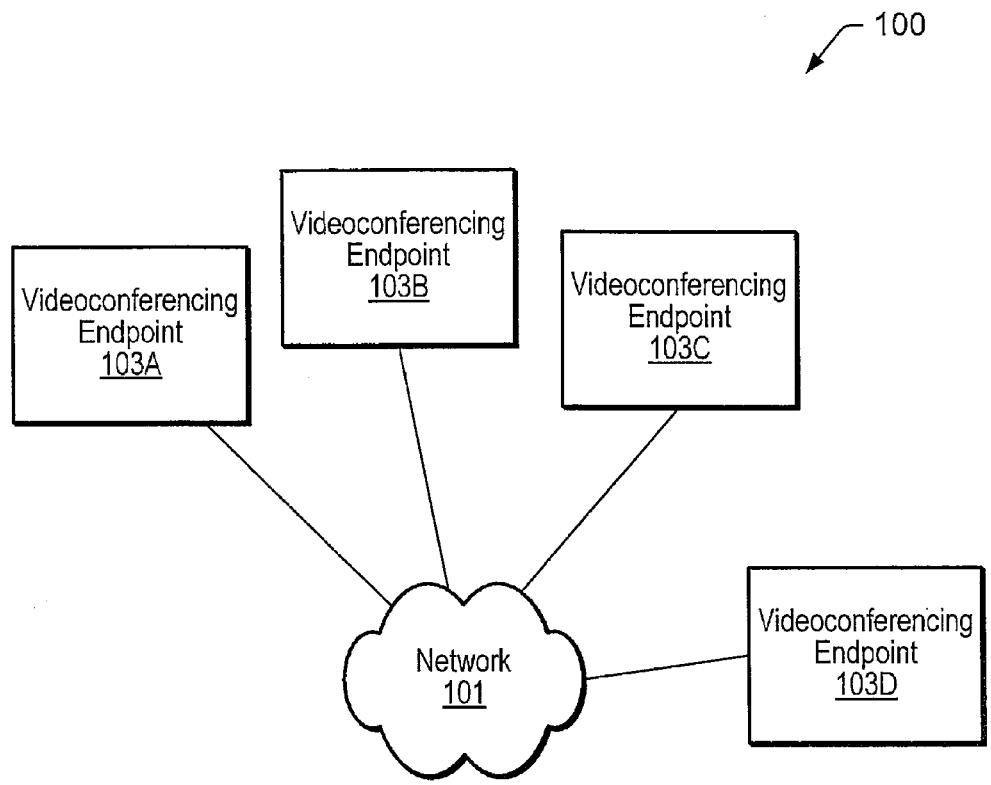
FIG. 1 illustrates a video conferencing endpoint network, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Speakerphone", Ser. No. 11/251,084, which was filed Oct. 14, 2005, whose inventor is William V. Oxford is hereby incorporated by reference in its entirety as though fully and completely set forth herein.

U.S. patent application titled "Videoconferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, which was filed Jun. 19, 2008, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, which was filed Jun. 19, 2008, whose inventors are Keith C. King and Wayne E. Mock, is hereby incorporated by reference in its entirety as though fully and completely set forth herein.

U.S. patent application titled "Integrated Videoconferencing System", Ser. No. 11/405,686, which was filed Apr. 17, 2006, whose inventors are Michael L. Kenoyer, Patrick D. Vanderwilt, Craig B. Malloy, William V. Oxford, Wayne E. Mock, Jonathan I. Kaplan, and Jesse A. Fourt is hereby incorporated by reference in its entirety as though fully and completely set forth herein.

FIG. 1 illustrates an embodiment of a video conferencing endpoint network 100. FIG. 1 illustrates an exemplary embodiment of a video conferencing endpoint network 100 which may include a network 101 and multiple endpoints 103a-103d (e.g., video conferencing endpoints). Although not shown in FIG. 1, the video conferencing system network 100 may also include other devices, such as gateways, a service provider, conference units, and plain old telephone system (POTS) telephones, among others. Endpoints 103a-103d may be coupled to network 101 via gateways (not shown). Gateways may each include firewall, network address translation (NAT), packet filter, and/or proxy mechanisms, among others. In the embodiments discussed below, the endpoints (e.g., endpoints 103a-103d) may implement a multi-way video conference call without using a multipoint control unit (MCU). The endpoints 103 may instead implement a "virtual MCU" as discussed herein.

The endpoints 103a-103d may include video conferencing system endpoints (also referred to as "participant locations"). Each endpoint 103a-103d may include a camera, display device, microphone, speakers, and a codec or other type of video conferencing hardware. In some embodiments, endpoints 103a-103d may include video and voice communications capabilities (e.g., video conferencing capabilities) and include or be coupled to various audio devices (e.g., microphones, audio input devices, speakers, audio output devices, telephones, speaker telephones, etc.) and include or be coupled to various video devices (e.g., monitors, projectors, displays, televisions, video output devices, video input devices, cameras, etc.). In some embodiments, endpoints 103a-103d may include various ports for coupling to one or more devices (e.g., audio devices, video devices, etc.) and/or to one or more networks. Endpoints 103a-103d may each include and/or implement one or more real time protocols, e.g., session initiation protocol (SIP), H.261, H.263, H.264, H.323, among others. In an embodiment, endpoints 103a-103d may implement H.264 encoding for high definition (HD) video streams.

The network 101 may include a wide area network (WAN) such as the Internet. The network 101 may include a plurality of networks coupled together, e.g., one or more local area networks (LANs) coupled to the Internet. The network 101 may also include public switched telephone network (PSTN). The network 101 may also include an Integrated Services Digital Network (ISDN) that may include or implement H.320 capabilities. In various embodiments, video and audio conferencing may be implemented over various types of networked devices.

In some embodiments, endpoints 103a-103d may each include various wireless or wired communication devices that implement various types of communication, such as wired Ethernet, wireless Ethernet (e.g., IEEE 802.11), IEEE 802.16, paging logic, RF (radio frequency) communication logic, a modem, a digital subscriber line (DSL) device, a cable (television) modem, an ISDN device, an ATM (asynchronous transfer mode) device, a satellite transceiver device, a parallel or serial port bus interface, and/or other type of communication device or method.

In various embodiments, the methods and/or systems described may be used to implement connectivity between or among two or more participant locations or endpoints, each having voice and/or video devices (e.g., endpoints 103a-103d) that communicate through network 101.

In some embodiments, the video conferencing system network 100 (e.g., endpoints 103a-d) may be designed to operate with network infrastructures that support T1 capabilities or less, e.g., 1.5 mega-bits per second or less in one embodiment, and 2 mega-bits per second in other embodiments. In some embodiments, other capabilities may be supported (e.g., 6 mega-bits per second, over 10 mega-bits per second, etc). The video conferencing endpoint may support HD capabilities. The term "high resolution" includes displays with resolution of 1280×720 pixels and higher. In one embodiment, high-definition resolution may include 1280×720 progressive scans at 60 frames per second, or 1920×1080 interlaced or 1920×1080 progressive. Thus, an embodiment of the present invention may include a video conferencing endpoint with HD "e.g. similar to HDTV" display capabilities using network infrastructures with bandwidths T1 capability or less. The term "high-definition" is intended to have the full breath of its ordinary meaning and includes "high resolution".

Figure 2:
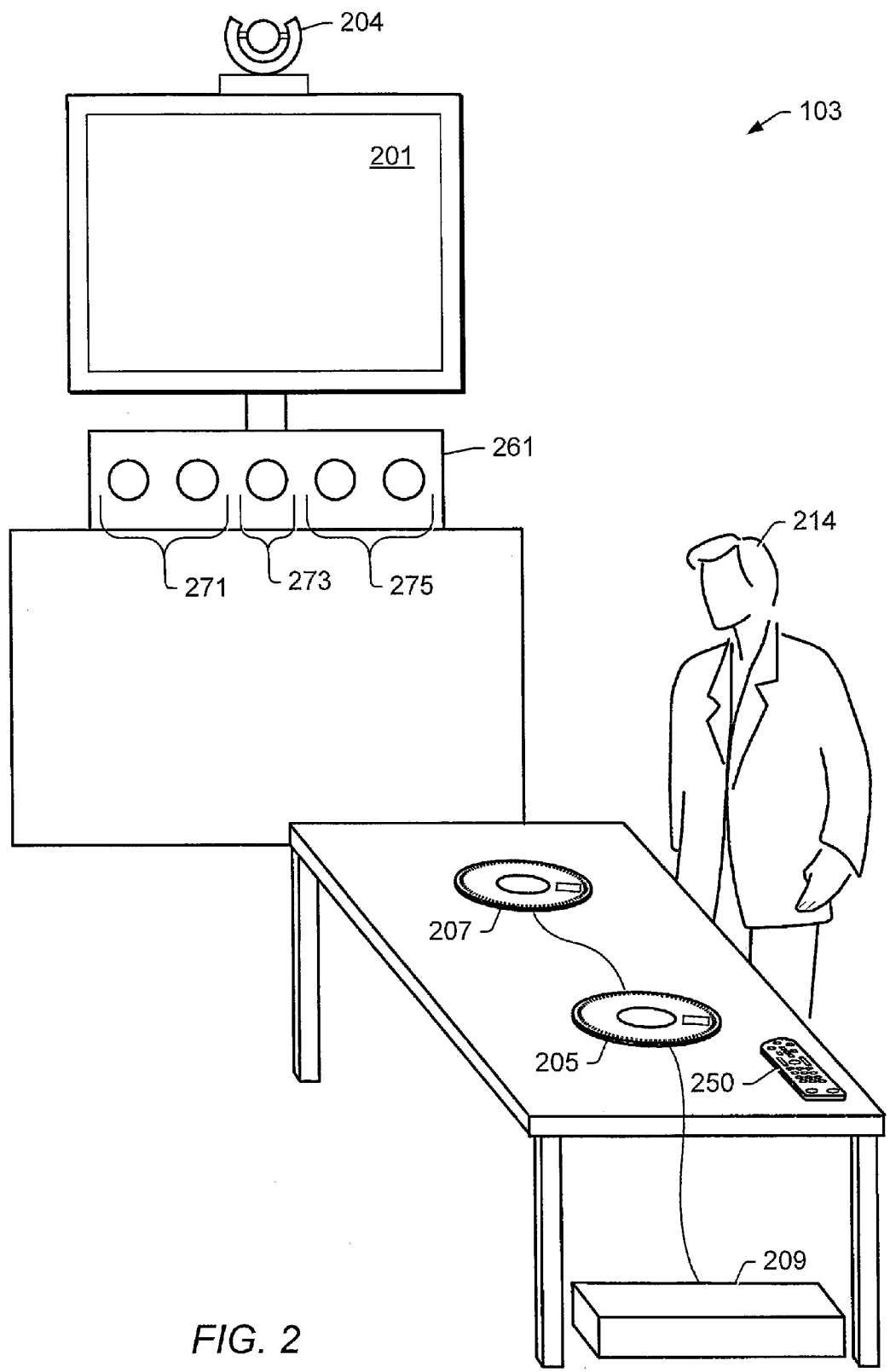
FIG. 2 illustrates a video conferencing endpoint, according to an embodiment.

FIG. 2 illustrates an exemplary embodiment of a video conferencing endpoint 103 (e.g., endpoint 103a), also referred to as a participant location. The endpoint 103 may have a system codec box 209 to manage both a speakerphone 205/207 and the video conferencing devices. The speakerphones 205/207 and other video conferencing endpoint components may be coupled to the codec box 209 and may receive audio and/or video data from the system codec box 209.

In some embodiments, the endpoint 103 may include a camera 204 (e.g., an HD camera) for acquiring video images of the participant location (e.g., of participant 214). Other cameras are also contemplated. The endpoint 103 may also include a display 201 (e.g., an HDTV display). Video images acquired by the camera 204 may be displayed locally on the display 201 and may also be encoded and transmitted to other video conferencing endpoints 103 in the video conference.

The endpoint 103 may also include a sound system 261. The sound system 261 may include multiple speakers including left speakers 271, center speaker 273, and right speakers 275. Other numbers of speakers and other speaker configurations may also be used. The endpoint 103 may also use one or more speakerphones 205/207 which may be daisy chained together.

In some embodiments, the video conferencing endpoint components (e.g., the camera 204, display 201, sound system 261, and speakerphones 205/207) may be coupled to the system codec ("compressor/decompressor") box 209. The system codec box 209 may be placed on a desk or on a floor. Other placements are also contemplated. The system codec box 209 may receive audio and/or video data from a network (e.g., network 101). The system codec box 209 may send the audio to the speakerphone 205/207 and/or sound system 261 and the video to the display 201. The received video may be HD video that is displayed on the HD display. The system codec box 209 may also receive video data from the camera 204 and audio data from the speakerphones 205/207 and transmit the video and/or audio data over the network 101 to another conferencing system. The conferencing system may be controlled by a participant 214 through the user input components (e.g., buttons) on the speakerphones 205/207 and/or remote control 250. Other system interfaces may also be used.

In various embodiments, the system codec box 209 may implement a real time transmission protocol. In some embodiments, a system codec box 209 may include any system and/or method for encoding and/or decoding (e.g., compressing and decompressing) data (e.g., audio and/or video data). In some embodiments, the system codec box 209 may not include one or more of the compressing/decompressing functions. In some embodiments, communication applications may use system codec box 209 to convert an analog signal to a digital signal for transmitting over various digital networks (e.g., network 101, PSTN 120, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the endpoint 103 may display different video images of various participants, presentations, etc. during the video conference. Video to be displayed may be transmitted as video streams (e.g., video stream 300 as seen in FIG. 3) between the endpoints 103 (e.g., endpoints 103).

FIGS. 3-6 describe operation of a virtual decoder, which may be used in each of a plurality of endpoints to implement a "virtual MCU" as described herein.

Figure 3:
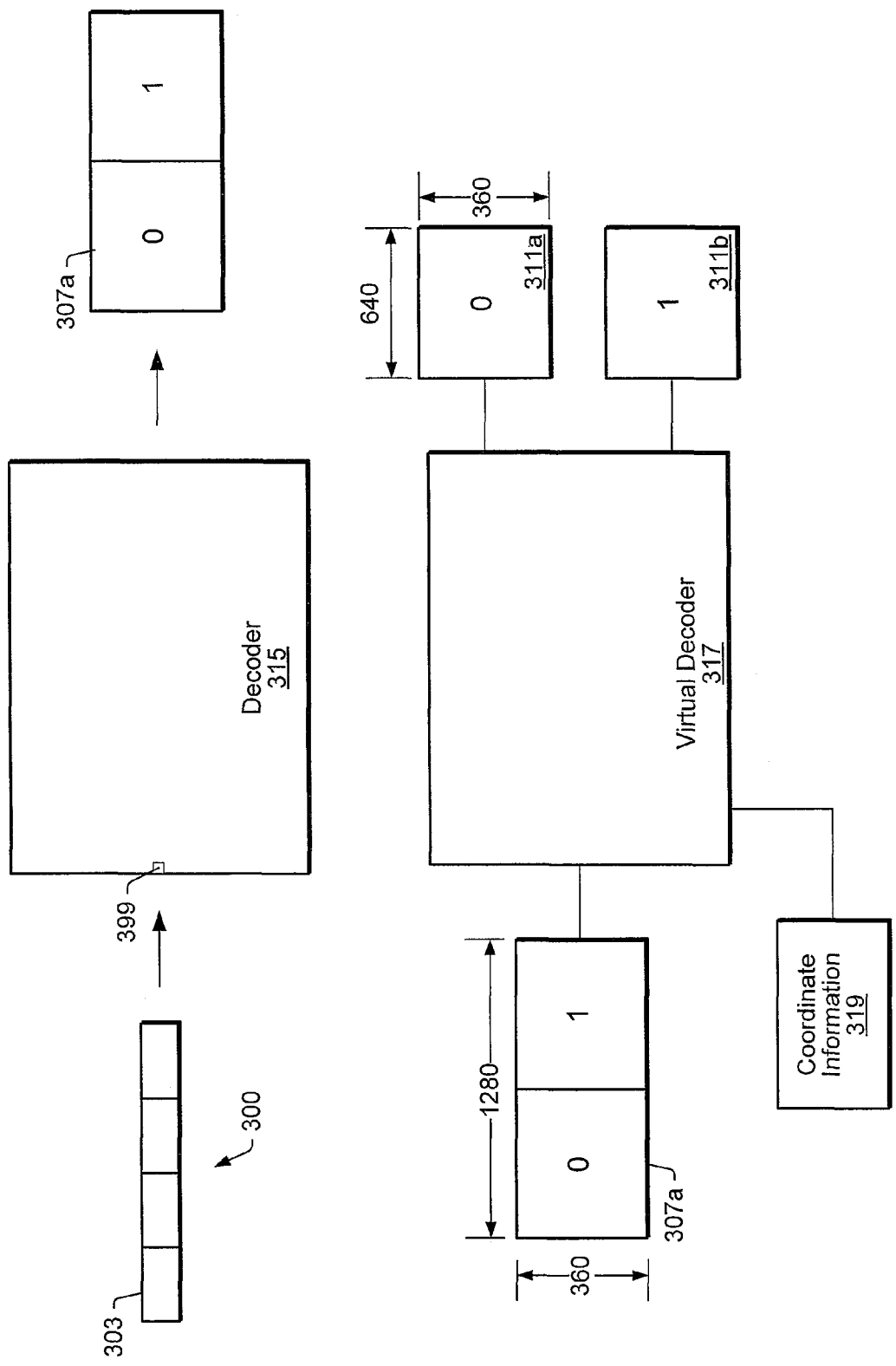
FIG. 3 illustrates a virtual decoder, according to an embodiment.

FIG. 3 illustrates an example of a video stream 300 with video packets 303 that are used by the decoder 315 to compose video frames 307a to be provided to virtual decoder 317. In some embodiments, the video stream 300 may be received at video input 399. In some embodiments, the endpoints 103 may composite different video images 311 (e.g., video images 311a,b) into a video frame 307a for the video stream 300. For example, one or more of the video frames 307a may include a continuous presence layout (or other video image layout) of video images 311 from various endpoints 103 involved in the video conference. The video image layout may include two or more different video images 311 (e.g., each from a different endpoint 103) in different sections of a displayed video frame 307a. In some embodiments, the video image layout may include video images (e.g., of participants, presentations, etc.) from remote endpoints 103 as well as from a local endpoint 103. The video image layout may be displayed by the receiving endpoint 103 on display 201.

Figure 4A:
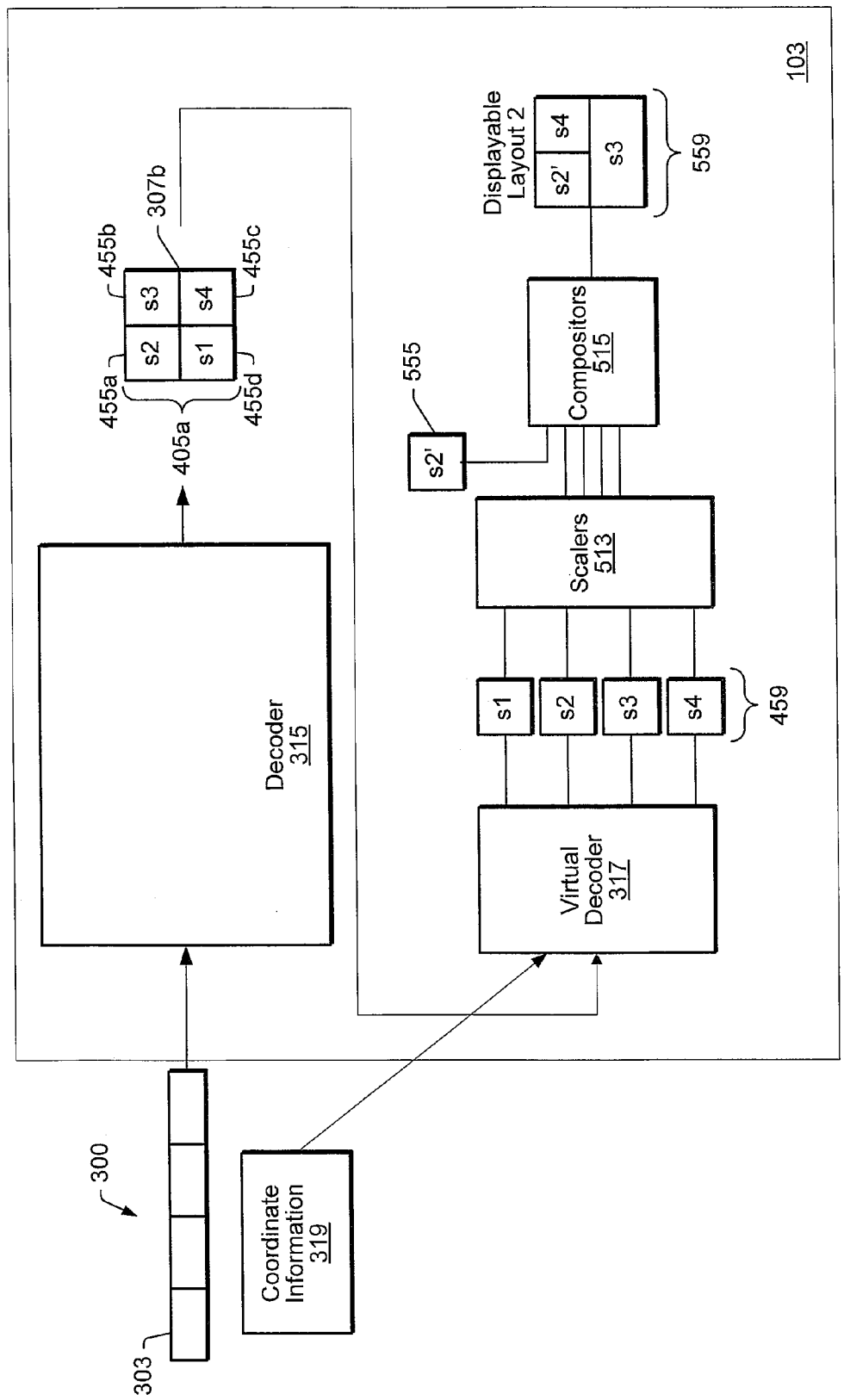
FIG. 4a illustrates an overall view of the re-compositing process including a virtual decoder, according to an embodiment.
Figure 4B:
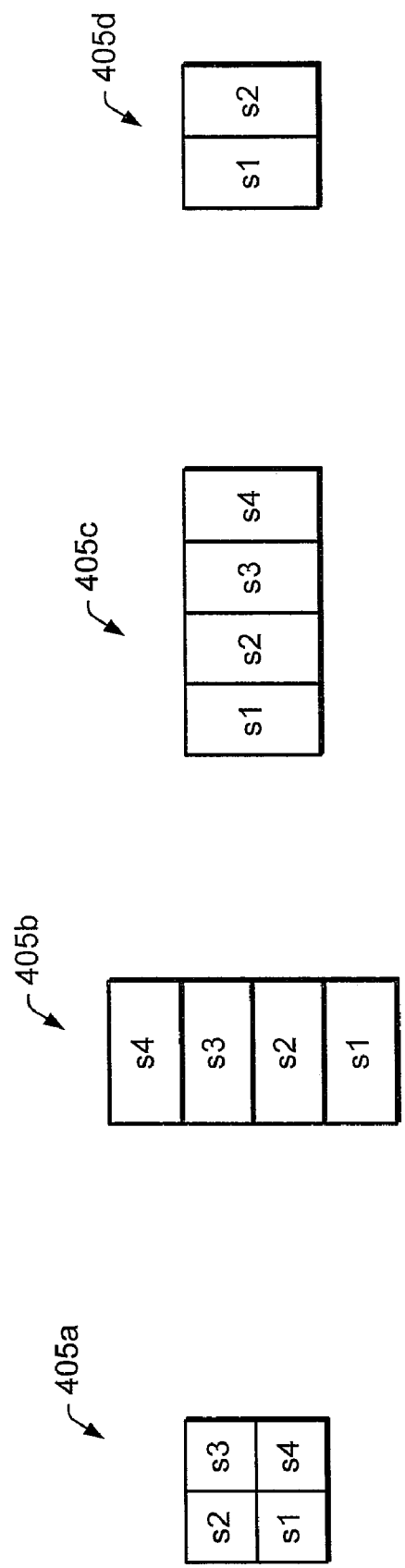
FIG. 4b illustrates several embodiments of composite video images.

While two video images 311 are shown with respect to video frame 307a, it is to be understood that video frames 307 ("video frames 307" used herein to refer to various video frames 307a, 307b, etc.) may include a video image layout with other combinations and layouts of two or more video images (e.g., video frame 307b in FIG. 4 has four video images 455a-d). Additional examples are shown in FIG. 4b (e.g., video frame 307 may include various video image layouts). Video image layout 405b may include four video images 455 stacked on top of each other. In some embodiments, each video image of the stacked video images may be 1280 by 720 pixels (e.g., for a total size of 1280 by 2880)

(other dimensions and number of video images are also contemplated). In some embodiments, video image layout 405*c* may include four images side by side. As another example, the video image layout 405*d* may include two video images (e.g., each 640 by 360 pixels) arranged side by side in a 1280 by 360 pixel video frame. The video frame 307 may then be separated into two 640 by 360 pixel video images. Other combinations and layouts are also contemplated. In some embodiments, the number of video images 455 composited in the video image layout 405 may depend on the number of participating endpoints in the video conference. For example, each participating endpoint may have a corresponding video image (which may be, for example, 1280 by 720) in the video image layout 405 of video frame 307.

As seen in FIG. 3, the video streams 300 may be decoded (e.g., in video stream decoder 315) prior to being sent to the virtual decoder 317. In some embodiments, the composited video images 311 of the video frames 307 may then be separated into separate video images 311*a,b* by the virtual decoder 317. For example, a 1280 by 360 video frame 307 may be separated into two 640 by 360 video images 311*a,b*. Other dimensions are also contemplated. The video images 311 may then be scaled and composited into a video image layout that may be different from the video image layout of the received video frame 307. In some embodiments, the virtual decoder 317 may be implemented as a software abstraction on hardware such as a field programmable gate-array (FPGA). In some embodiments, one or more virtual decoders 317 may be implemented on a single ASIC (Application Specific Integrated Chip). Other virtual decoder configurations are also contemplated.

In some embodiments, the virtual decoder 317 may use coordinate information 319 for the video images 311 in the video frame 307 to find the boundaries of the video images 311 in order to separate the video images 311. In some embodiments, coordinate information 319 may be passed with the video frame 307 to provide the coordinates in the video frame 307 of the start (and/or stop) locations of video images 311 in the composited video image of video frame 307. For example, the coordinate information 319 may include boundary information (e.g., see coordinate information 319 in FIG. 13) for the video images 311 in the composited video image of video frame 307. Other coordinate information 319 is also contemplated. The coordinate information 319 may be used by the virtual decoder 317 to crop the respective video images 311 (e.g., video images 311*a* and 311*b*) in the video frame 307. In some embodiments, the coordinate information 319 may be passed as metadata 1321 (e.g., see FIG. 13) with the video frame 307 (e.g., in a video frame header). In some embodiments, coordinate information 319 may be prepared by an endpoint 103 preparing the video frames 307 for the video stream 300.

In some embodiments, one or more endpoints 103 may arrange the incoming video images into a composite video image with a requested video image layout and define the respective coordinate information for one or more of the video images in the composite video image including the size of the original composite video image. In some embodiments, one or more endpoints 103 may need to subsequently scale the composite video image (e.g., scale down the composite video image to be sent over a reduced bandwidth network connection) to be sent to one or more other endpoints 103. In some embodiments, the composite video image may be scaled to a scaled composite video image in a scaler. The coordinate information 319 may be included in metadata 1321 passed with a video frame 307 including the scaled composite video image. In some embodiments, the coordinate information 319 may be reformatted (e.g., at the sending endpoint or at the receiving endpoint) to reflect the new coordinates of one or more of the resized video images in the scaled composite video image. For example, when the endpoint 103 receives the scaled composite video image, the endpoint 103 may detect the actual size of the scaled composite video image and may determine the new coordinates of one or more of the video images in the scaled composite video image using, for example, a ratio of the size of the original composite video image to the size of the scaled composite video image detected by the endpoint 103. These new coordinates may then be used to separate one or more of the resized images in the scaled composite video image to use in compositing a new composite video image. For example, see U.S. Provisional Patent Application titled "Virtual Multiway Scaler Compensation", Ser. No. 60/949,674, which was filed Jul. 13, 2007, whose inventors are Keith C. King and Wayne E. Mock, which was incorporated by reference above.

FIG. 4*a* illustrates an overall view of the scaling and recompositing process including virtual decoder 317, according to an embodiment. In some embodiments, virtual decoder 317 may separate video images 455*a-d* in video image layout 405 (which may be included in a single video frame 307) into separate video images 459 to provide to one or more scalers 513. The one or more scalers 513 may scale one or more of the video images 459 and then may send them to one or more compositors 515. In some embodiments, one or more of the video images 459 (and/or other video images) may be sent to the compositors 515 without sending them to the scalers 513. The one or more compositors 515 may then assemble the video images 459 into a new video image layout 559 (e.g., selected by a local participant 214 through the local endpoint 103). In some embodiments, video data from a real time local video source 555 (e.g., from the local video camera) may be composited into the layout. The real time source video image may replace a corresponding video image in the new layout 559. Other alternative video sources are also contemplated.

Figure 5:
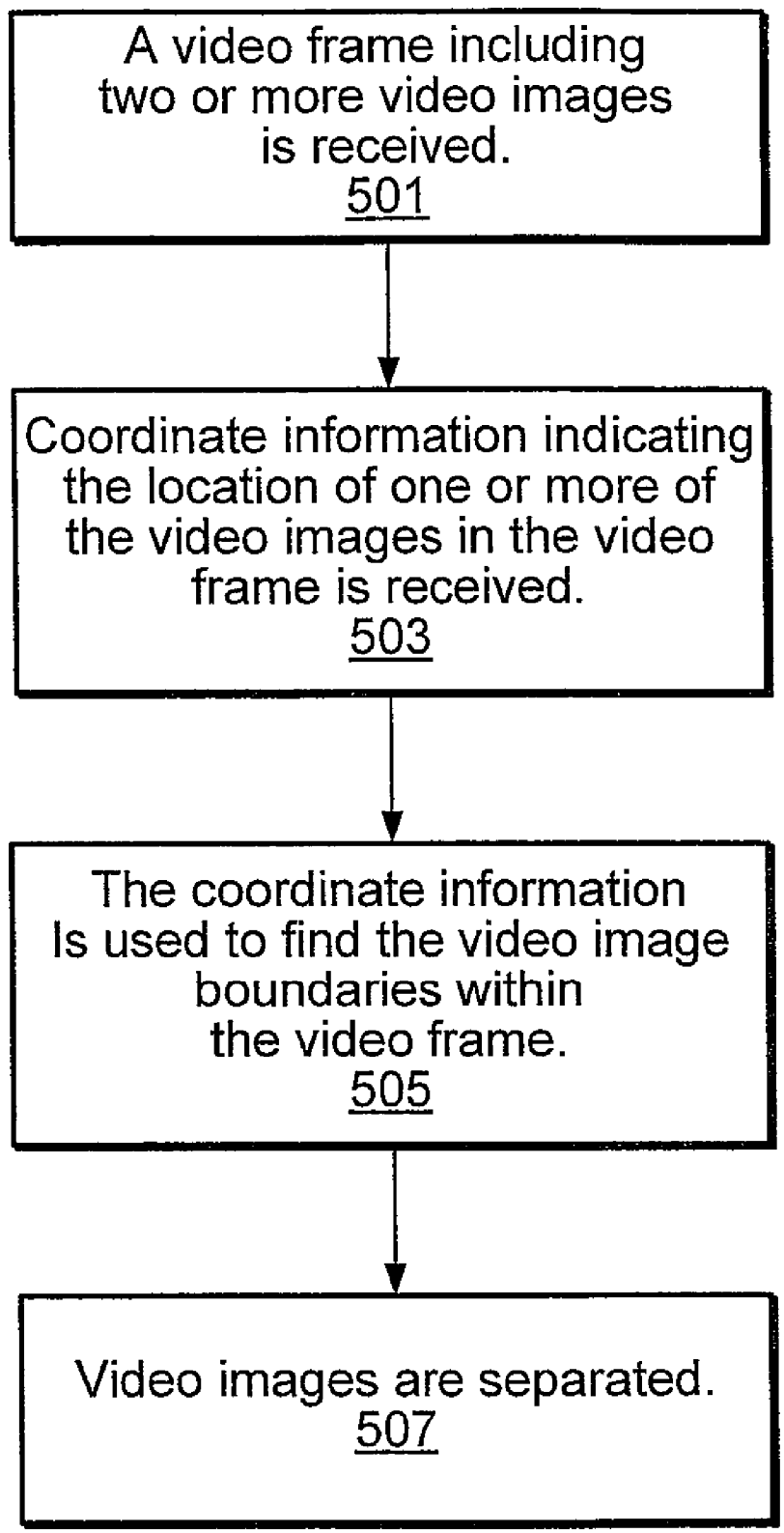
FIG. 5 illustrates a flowchart of a method for virtual decoding, according to an embodiment.

FIG. 5 illustrates a flowchart of a method for virtual decoding, according to an embodiment. It should be noted that in various embodiments of the methods described below, one or more of the elements described may be performed concurrently, in a different order than shown, or may be omitted entirely. Other additional elements may also be performed as desired.

At 501, a video frame 307 including two or more video images 311 may be received. For example, the video frame 307 may be received as a series of video packets 303 in a video stream 300 at decoder 315. The decoder 315 may assemble the video packets 303 into their respective video frames 307 for further processing in the virtual decoder 317.

Figure 11A:
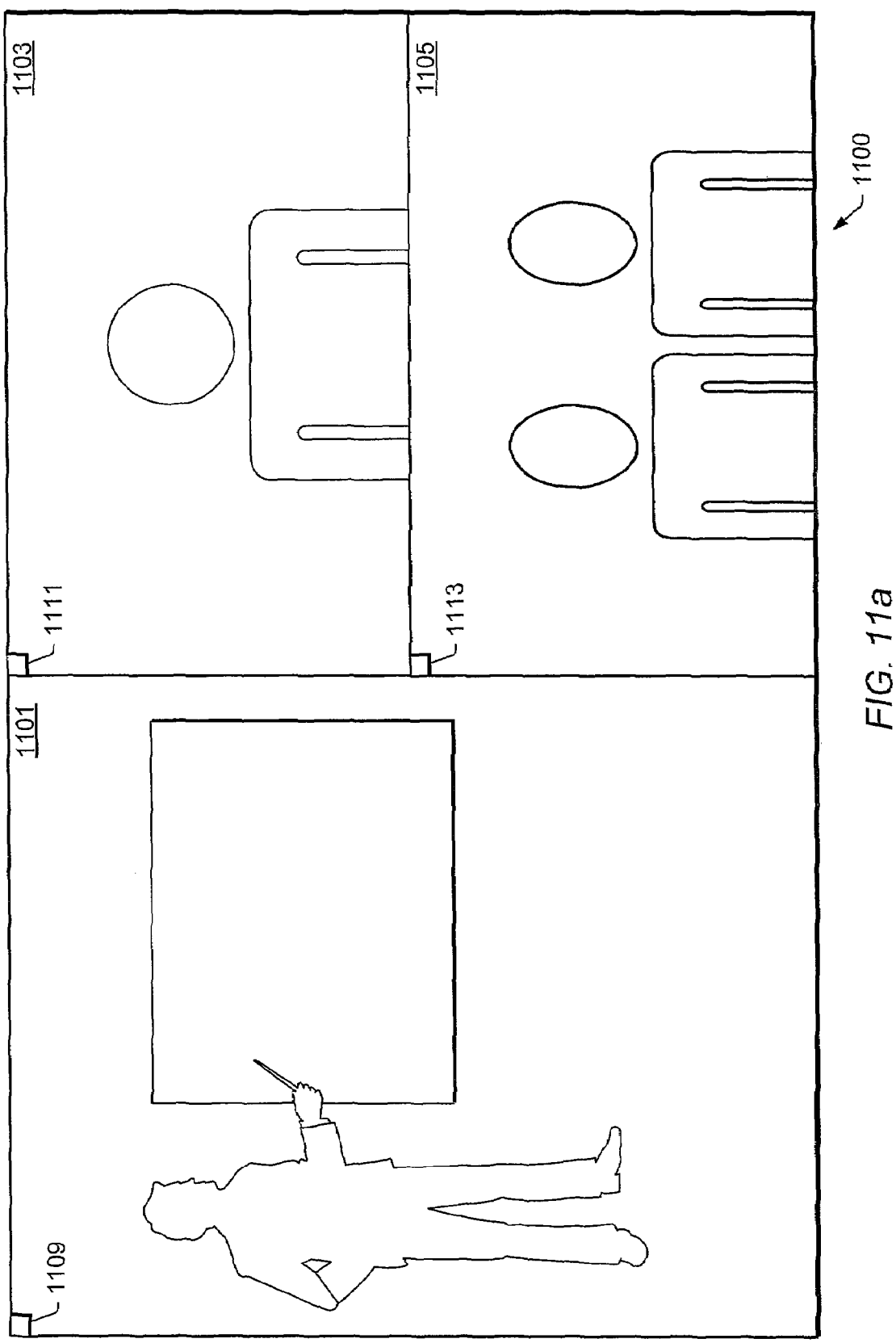
FIG. 11a illustrates a video image layout, according to an embodiment.

At 503, coordinate information 319 indicating the location of one or more of the video images 311 in the video frame 307 may be received. For example, the coordinate information 319 may be received in metadata 1321 (see FIG. 3) sent along with the video frame 307. In some embodiments, the video frame 307 may include a continuous presence layout of video images 311 (e.g., video image layout 1100 as seen in FIG. 11*a*).

Figure 13:
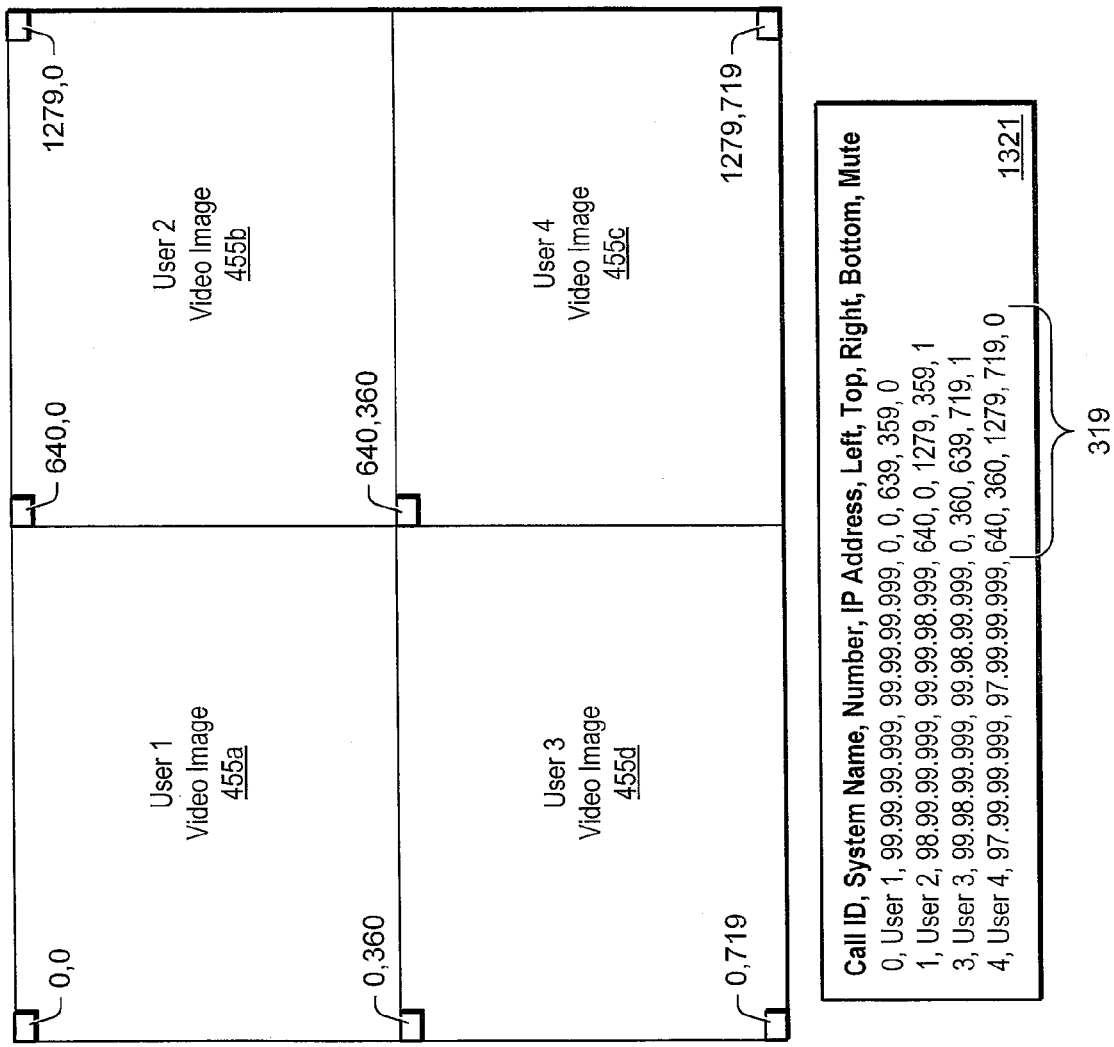
FIG. 13 illustrates a coordinate system for a video frame, according to an embodiment.

At 505, the coordinate information 319 may be used to find video image boundaries of the video images 311 within the video frame 307. In some embodiments, the coordinate information 319 may be used to determine where the video images 311 start and stop in the video frame 307. These start/stop locations may be used by the virtual decoder 317 to separate the video images 311 from the video frame 307. For example, as seen in FIG. 11*a*, coordinate information 319 for coordinates 1109, 1111, and 1113 may be sent with the video frame 307. FIG. 13 illustrates an example of a use of coordinate information 319 to locate the boundaries of video images (e.g., video images 455a-d) in order to separate the video images. For example, the User 1 video image 455a may have a left boundary at 0, a top boundary at 0, a right boundary at 639, and a bottom boundary at 359. Similarly, the user 2 video image 455b may have a left boundary at 640, a top boundary at 0, a right boundary at 1279, and a bottom boundary at 359. Coordinate information 319 (e.g., boundary information) for other video images (e.g., video images 455c and 455d) may also be provided in coordinate information 319.

Figure 11B:
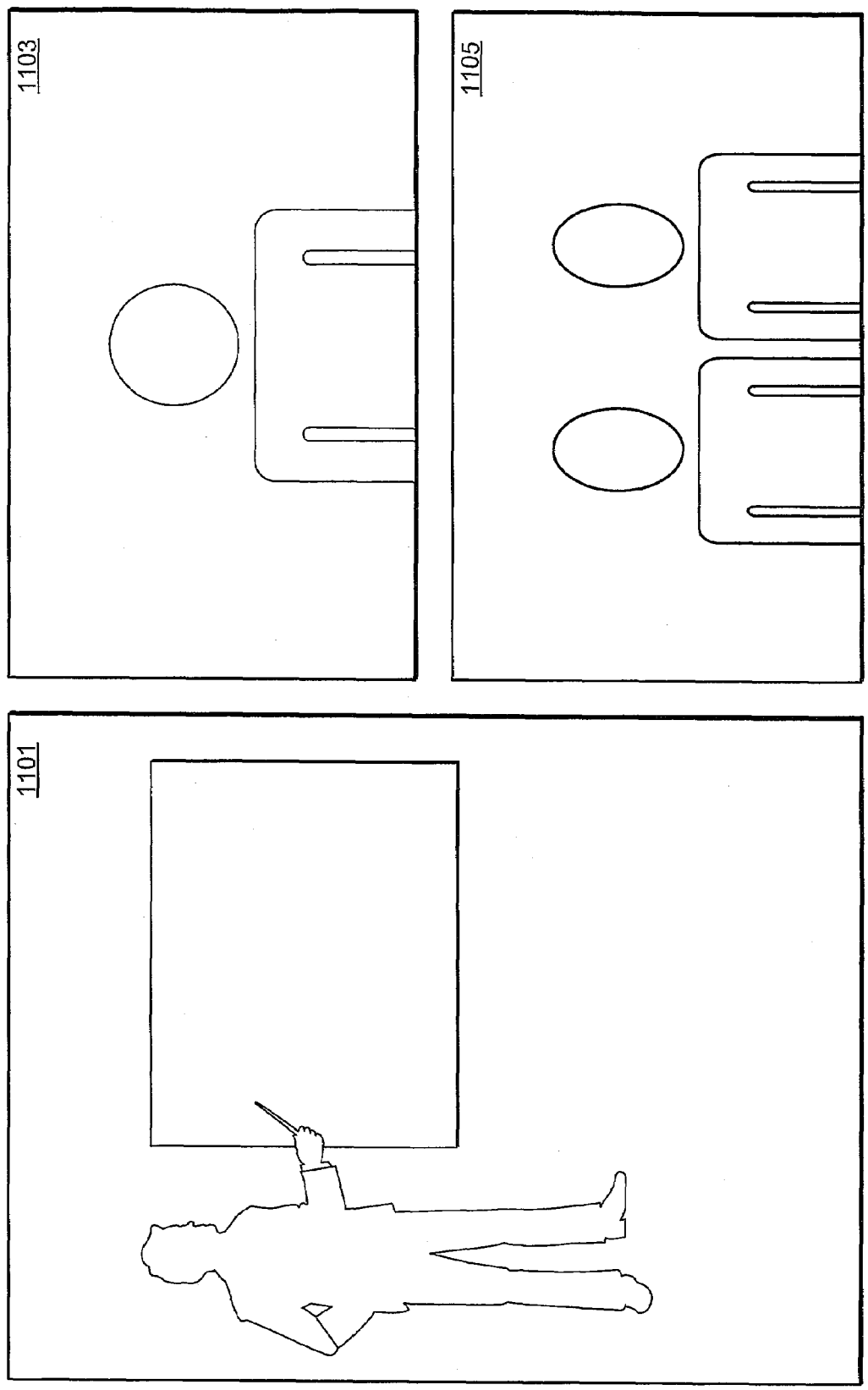
FIG. 11b illustrates separated video images from the video image layout, according to an embodiment.

At 507, the video images may be separated. In some embodiments, separate video images may be defined using the video images in the video frame 307 according to the coordinate information 319. For example, separate video images 1101, 1103, and 1105 (as seen in FIG. 11b) may be defined and/or scaled into separate video images 1101, 1103, and 1105. In some embodiments, separating the video images may include, for example, storing the separated video images 1101, 1103, and 1105 in separate locations of a memory. In some embodiments, separating the video images 1101, 1103, and 1105 may include storing start and/or stop locations of the video images 1101, 1103, and 1105 in memory. Other means for separating the video images are also contemplated. For example, separating may include copying, replacing, and/or modifying data from the video images to be used to create a new composite image.

Figure 6:
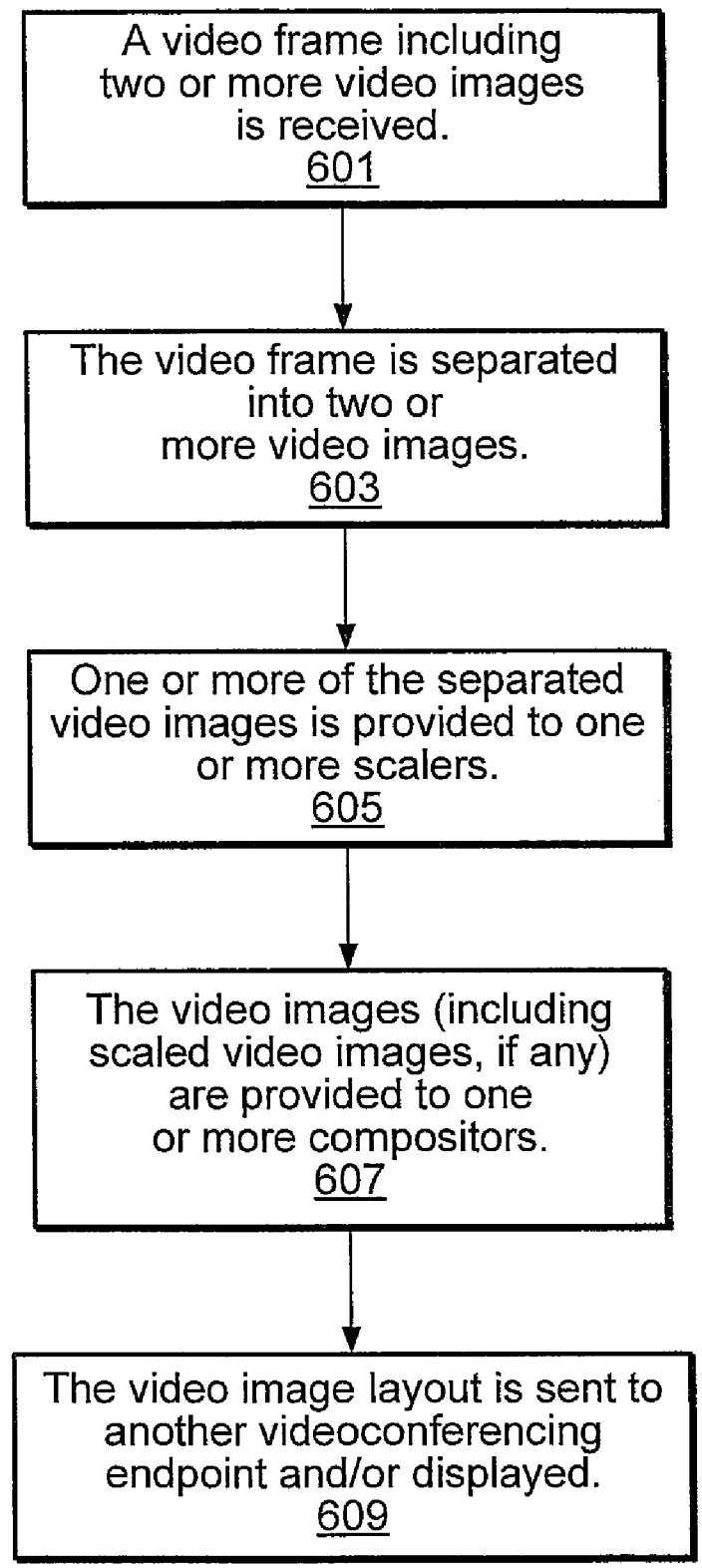
FIG. 6 illustrates a flowchart of a method for generating a new video image layout, according to an embodiment.

FIG. 6 illustrates a flowchart of a method for generating a new video image layout, according to an embodiment. It should be noted that in various embodiments of the methods described below, one or more of the elements described may be performed concurrently, in a different order than shown, or may be omitted entirely. Other additional elements may also be performed as desired.

At 601, a video frame 307 including two or more video images 311 may be received. The video frame 307 may include two or more video images 311. For example, video frame 307 may include image layout 1100 (see FIG. 11a) that includes video images 1101, 1103, and 1105 originating from different video conferencing endpoints 103. A main image 1101 may be an image of the video conferencing endpoint with the current speaker and two or more side images (e.g., side images 1103 and 1105) of other video conferencing endpoints participating in the video conference. In some embodiments, the video frame 307 may be received from another video conferencing endpoint (which, for example, received one or more of the video images in the image layout 1100 from other video conferencing endpoints). The video frame 307 may be received with coordinate information 319 (e.g., embedded in metadata 1321 received with the video frame 307). The coordinate information 319 may indicate the start/stop locations of one or more of the video images in the video frame 307. In some embodiments, the video frames 307 and coordinate information 319 may be transported together in video stream 300.

At 603, the video frame 307 may be separated into two or more video images (e.g., video images 1101, 1103 and 1105). The two or more separated video images may correspond to separate video conferencing endpoints 103. As seen in FIG. 11, one separated video image 1101 may correspond to the main image 1101 and two separate video images 1103 and 1105 may correspond to each of the two side images (e.g., images 1103 and 1105). In some embodiments, the coordinate information 319 may be used to determine where the video images start and stop in the video frame 307. These start/stop locations may be used by the virtual decoder 317 to separate the video images from the video frame 307. For example, coordinate information 319 for coordinates 1109, 1111, and 1113 may be sent with the video frame 307. FIG. 13 illustrates an example of a use of coordinate information 319 to locate the boundaries of video images in order to separate the video images. For example, the User 1 video image 455a may have a left boundary at 0, a top boundary at 0, a right boundary at 639, and a bottom boundary at 359. Similarly, the user 2 video image 455b may have a left boundary at 640, a top boundary at 0, a right boundary at 1279, and a bottom boundary at 359. Coordinate information 319 (e.g., boundary information) for other video images (e.g., video images 455c and 455d) may also be provided in coordinate information 319. In some embodiments, coordinate information 319 for a respective video image may be placed in a row of information for the respective video image. For example, row one of data in metadata 1321 may include a call identifier, system name, number, Internet Protocol (IP) address, and left, top, right, bottom coordinates (e.g., 0, 0, 639, and 359) for a respective video image (other information may also be included).

In some embodiments, the coordinate information 319 may be sent in metadata 1321 sent in video stream 300 between video conference endpoints 103. The metadata 1321 may include coordinate information 319 for a video frame with the start (and/or stop) information for a video image (e.g., image boundaries and/or pixel start/stop points) corresponding to a video conferencing endpoint 103, identifying information respective to the corresponding video conferencing endpoint 103, and other information.

At 605, one or more of the separated video images (e.g., separated video image 1101, 1103, or 1105) may be provided to one or more scalers (e.g., scalers 513). In some embodiments, one or more of the video images may be scaled according to a video image layout the video images are to be placed in. For example, if the main image 1101 and each of the two side images 1103 and 1105 are to be placed in a video image layout with equal sized video images, the main image 1101 may be scaled down and the two side video images 1103 and 1105 may be scaled up. Other scaling combinations are also contemplated. In some embodiments, the separated video images may not be scaled (e.g., the separated video images may be only rearranged).

At 607, the video images (including scaled video images, if any) may be provided to one or more compositors (e.g., compositors 515). In some embodiments, the compositors may composite the video images into a video frame for sending to another video conferencing endpoint. For example, to implement a multi-way conference, one of the separated video images may be composited with, for example, a video image from a local camera and the composited video frame may be sent to a remote video conferencing endpoint. In some embodiments, the compositor may composite the video images into a video image layout specified by a local participant 214 for display.

Figure 12:
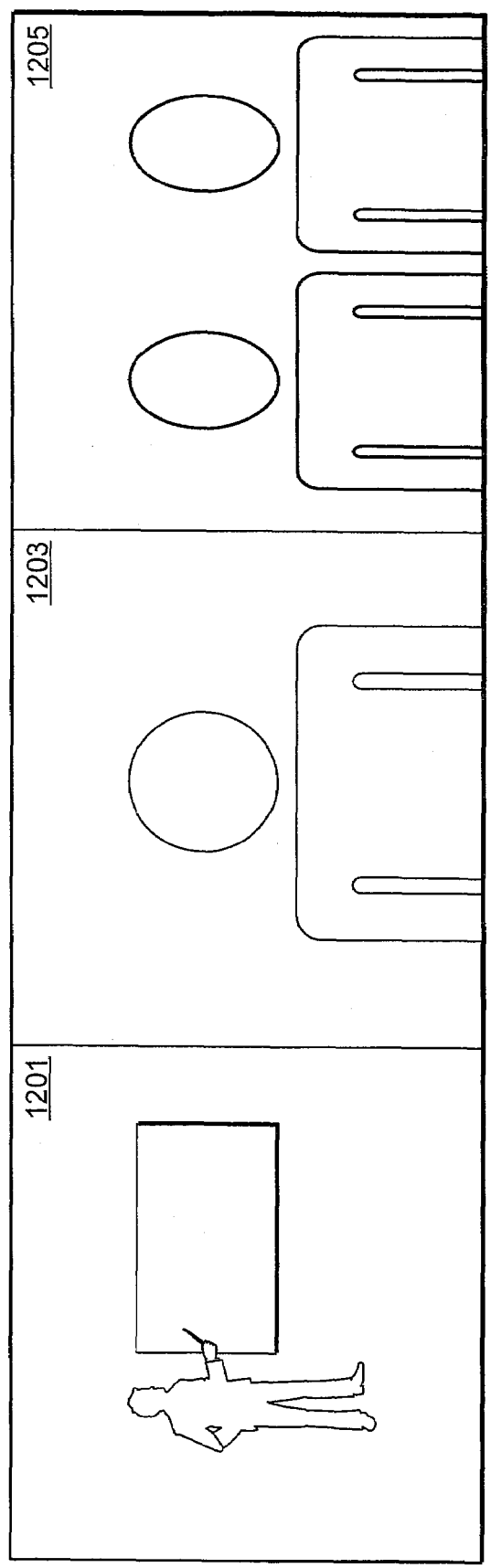
FIG. 12 illustrates a new video layout using the separated video images, according to an embodiment.
Figure 14:
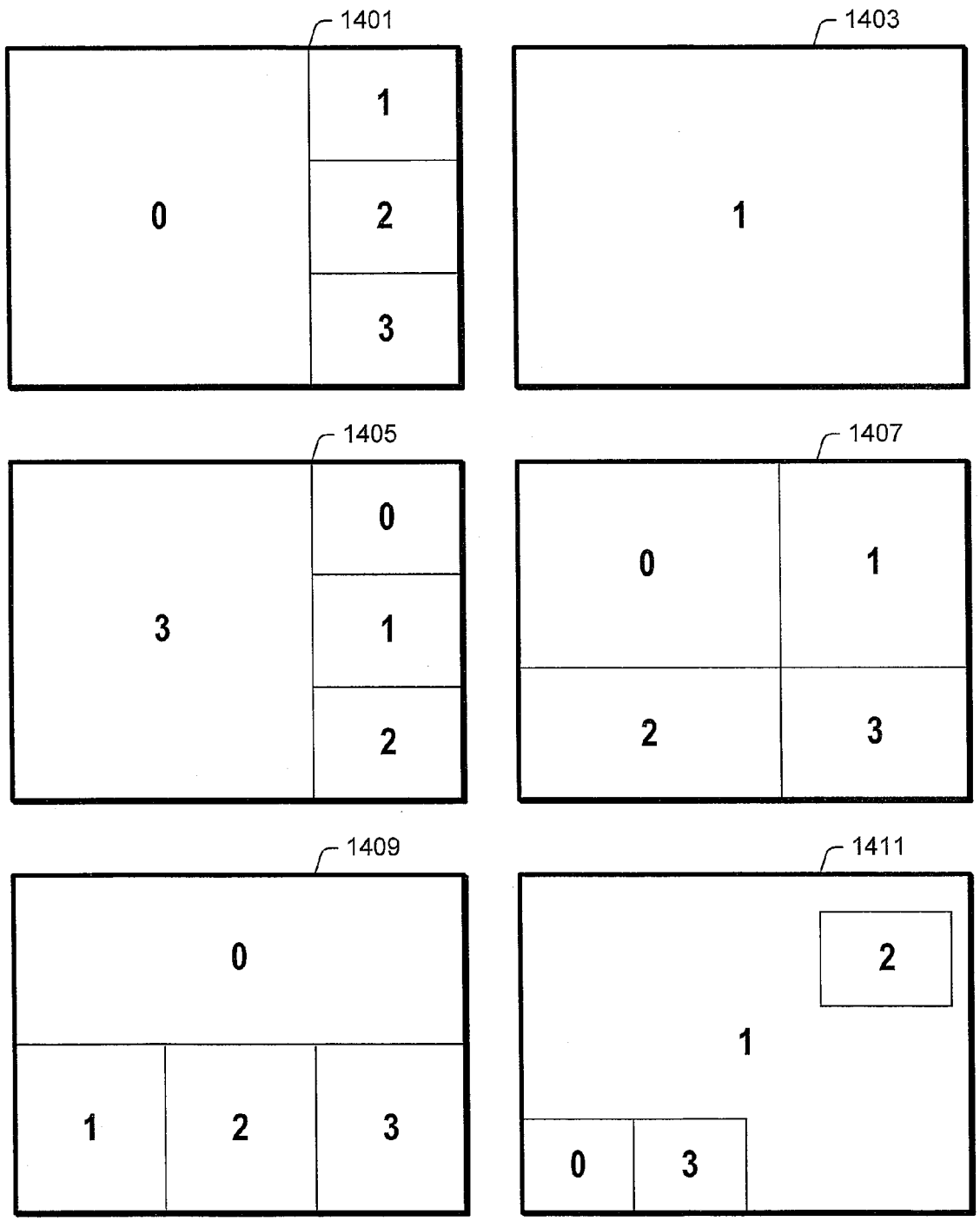
FIG. 14 illustrates various video image layouts, according to various embodiments.

At 609, the video image layout may be sent to another video conferencing endpoint and/or displayed. In some embodiments, the video image layout may be different from the video image layout of the video images received at the video conferencing endpoint 103. FIG. 12 illustrates an example of a new video image layout with three similar sized images 1201, 1203, and 1205 on display. FIG. 14 illustrates other possible video image layouts (e.g., layouts 1401, 1403, 1405, 1407, 1409, and 1411), according to various embodiments. Other video image layouts are also contemplated. Each video conferencing endpoint 103 may be operable to configure its own video image layout (e.g., according to a layout requested by a local participant 214 through the video conferencing endpoint 103). In some embodiments, a local participant 214 may cycle through the layout offerings from their video conferencing endpoint 103 (e.g., by clicking an icon to cycle to the next available layout).

Figure 7A:
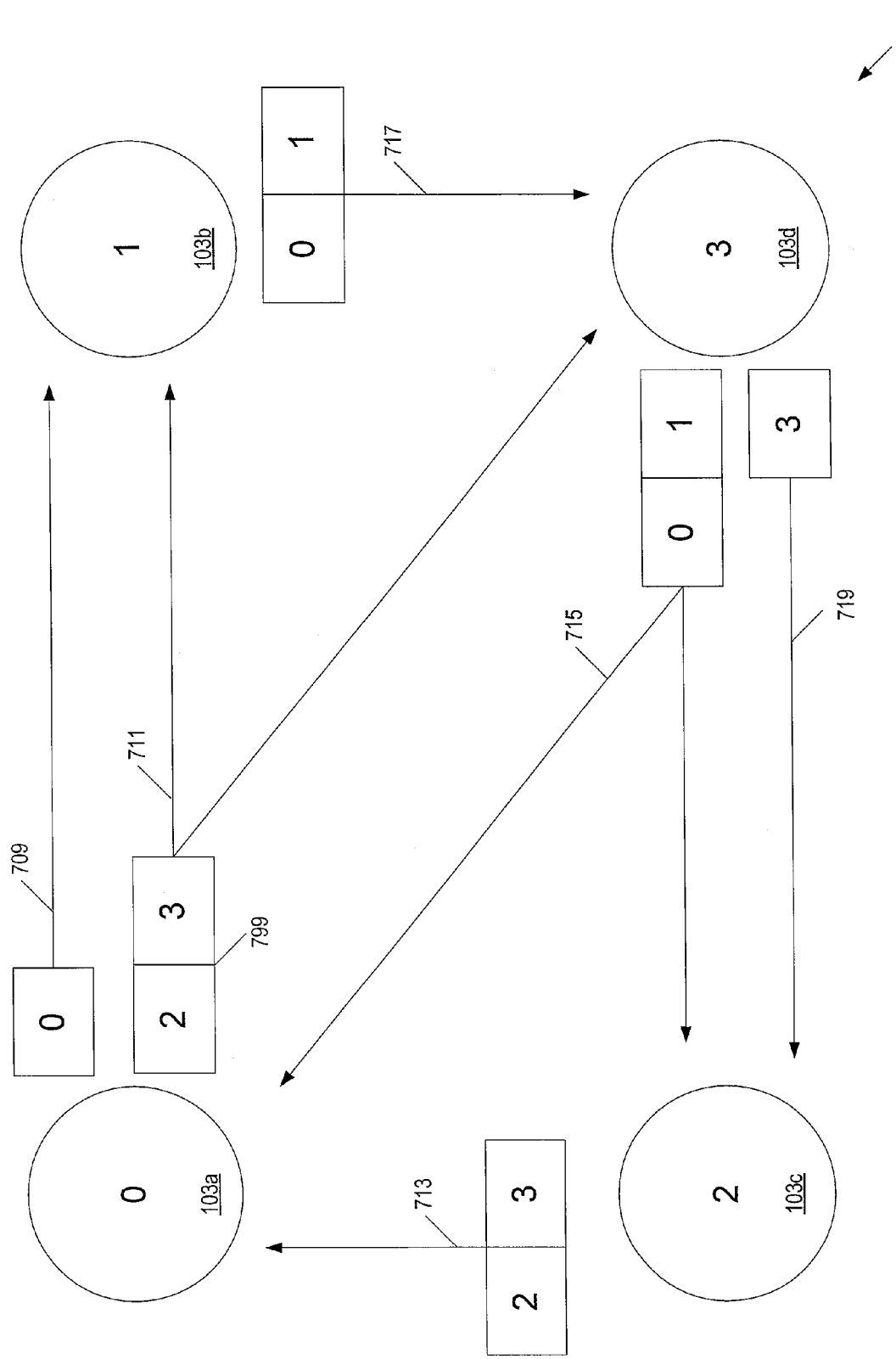
FIG. 7a illustrates a 4-way video conference in which each video conferencing endpoint is capable of receiving two input video streams, according to an embodiment.

FIG. 7a illustrates an embodiment for multiway video conferencing in which the video conferencing endpoints 103 operate together to implement multi-way continuous presence video conferencing without requiring a physical MCU. As described above, the manner in which the endpoints operate together to implement multi-way continuous presence video conferencing without requiring a physical MCU may be referred to as a "Virtual MCU".

As shown in the embodiment of FIG. 7a, each video conferencing endpoint (e.g., video conferencing endpoints 103a-d) is capable of receiving two input video streams. Other numbers of input streams are also contemplated. For example, video conferencing endpoints may receive three input streams (e.g., see FIG. 7b). Larger multi-way conferences may be conducted as the number of inputs and/or outputs on the video conferencing endpoints increase. In some embodiments, an input video stream for at least one of the video conferencing endpoints (e.g., input video stream 711) may include two or more video images (e.g., corresponding to two or more video conferencing endpoints). For example, input video streams 711, 713, 715, or 717 may include two video images each. Other numbers of video images in input video streams are also contemplated. For example, single video image streams may also be transmitted (e.g., single video images 709 and 719 may be transmitted). In some embodiments, one or more of the video conferencing endpoints may determine which video conferencing endpoints will send/receive which video images to facilitate a multi-way video conference. For example, video conferencing endpoint 103a may determine for a four-way video conference between video conferencing endpoints 103a-d which combinations of video images each respective video conferencing endpoint needs to send and/or receive. The video conferencing endpoint 103a may use pre-determined rulesets, patterns, and/or manual designations from participants. For example, pattern 700a shown as FIG. 7a may be used to determine which video conferencing endpoints should send which video images and to whom by mapping the current video conferencing endpoints in a video call to the pattern 700a shown in FIG. 7a. For example, one video conferencing endpoint may be mapped as video conferencing endpoint 0 (103a) and may transmit a video frame with the video image from itself (video conferencing endpoint 0 (103a)) to another video conferencing endpoint in the call mapped as video conferencing endpoint 1 (103b). Video conferencing endpoint 0 (103a) may also send a video frame with video images for video conferencing endpoint 2 (103c) and video conferencing endpoint 3 (103d) to both the video conferencing endpoint mapped as video conferencing endpoint 1 (103b) and to another video conferencing endpoint mapped as video conferencing endpoint 3 (103d). This mapping may be applied to each of the video conferencing endpoints and instructions may be sent to each to indicate which video images to send to which video conferencing endpoints. In some embodiments, multiple video conferencing endpoints may make their own determinations (e.g., if each is using the same pattern). Other means for determining the video image combinations to send between the video conferencing endpoints are also contemplated. In some embodiments, instructions may be communicated to each of the video conferencing endpoints directly from video conferencing endpoint 103a or, for example, using a round-robin transmission. In some embodiments, for example, at the start of the video conference or if one of the video conferencing endpoints in the video conference experiences an error, video conference endpoints may send the video images available to them in the determined pattern and may wait until they receive video images from other video conference endpoints before the video conferencing endpoint can send each video image combination assigned. For example, video conferencing endpoint 103a may send a video frame with the video image from itself (video conferencing endpoint 103a) to video conference endpoint 103b, but may wait until receiving video images from video conferencing endpoints 103c and 103d (e.g., received from video conferencing endpoint 103c) until sending the video images from video conferencing endpoints 103c and 103d to video conferencing endpoints 103b and 103d. Video conferencing endpoint 103c may send the video images from video conferencing endpoints 103c and 103d upon receiving the video image from video conferencing endpoint 103d. During the video conference, the video conferencing endpoints may send the video images available to them according to the pattern. For example, if video conferencing endpoint 103a receives a video image from video conferencing endpoint 103c which does not include the video image from video conferencing endpoint 103d as designated by the pattern 700a, video conferencing endpoint 103a may send the video image from video conferencing endpoint 103c to video conferencing endpoints 103b and 103d without the video image from video conferencing endpoint 103d (until video conferencing endpoint 103a receives both video images (for video conferencing endpoint 103c and 103d)) from video conferencing endpoint 103c.

Figure 7B:
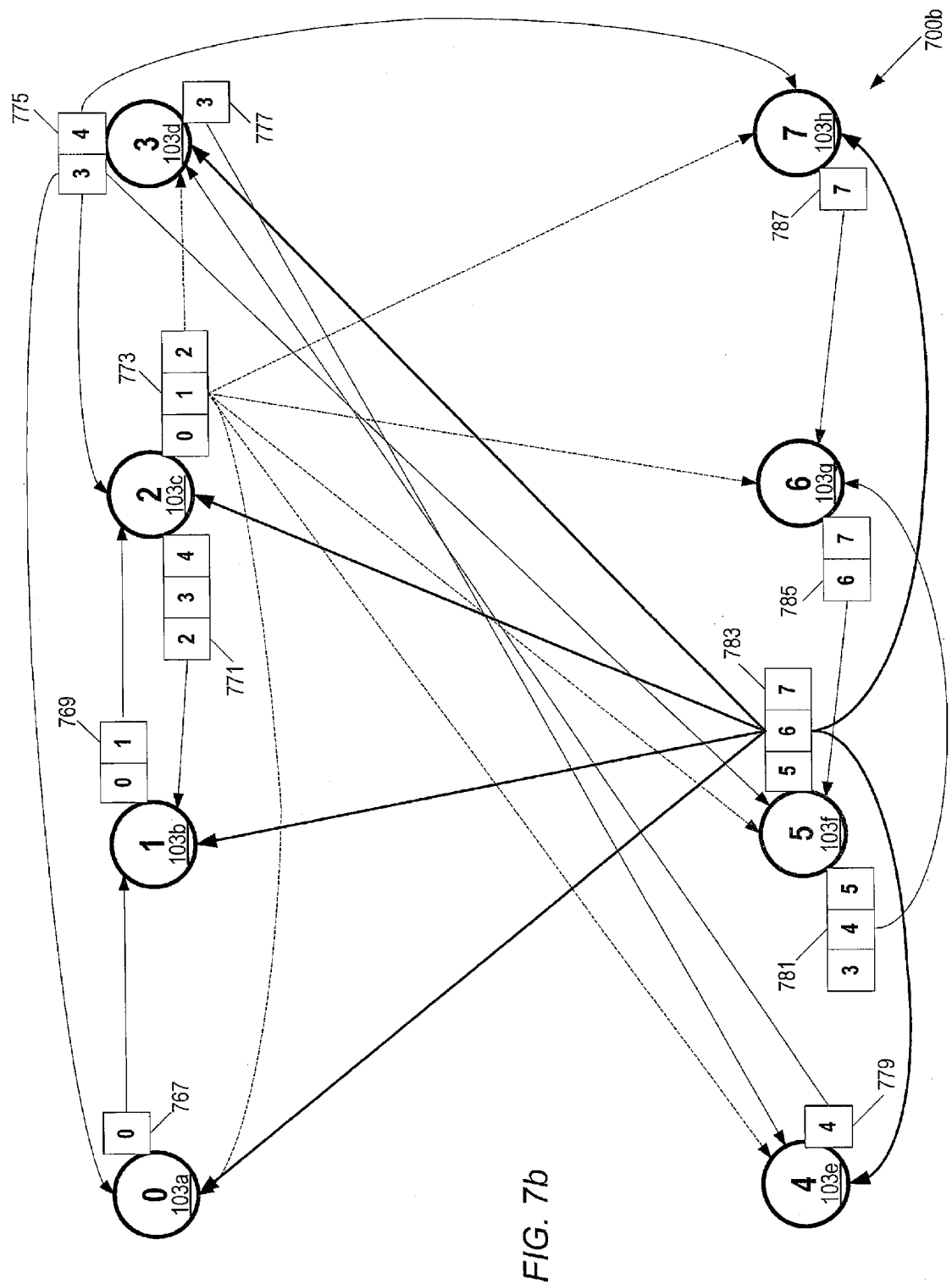
FIG. 7b illustrates an 8-way video conference in which each video conferencing endpoint is capable of receiving three input video streams, according to an embodiment.

As another example, as seen in FIG. 7b, video conferencing endpoints 103a, 103b, 103c, 103d, 103e, 103f, 103g, and 103h may each be capable of receiving 3 input video streams. In the 8-way video conference shown in FIG. 7b, input video streams 771, 773, 781, and 783 may each have three video images, input video streams 769, 775, and 785 may each have two video images and input video streams 767, 777, 779, and 787 may each have one video image. Other configurations for the 8-way call are also contemplated. In some embodiments, video conferencing endpoints with various capabilities (e.g., maximum number of receivable input video streams) may be mixed in the same network.

In some embodiments, the patterns (e.g., patterns 700a and 700b) may change dynamically as video conferencing endpoints are added and/or dropped during the video conference. Rulesets may be used to compensate and/or rearrange transmissions for dropped video conferencing endpoints. In some embodiments, a video conference call may only be able to support a maximum number of callers and may return an error message or required system requirements if an attempt is made to add an additional caller past the maximum number.

Figure 8:
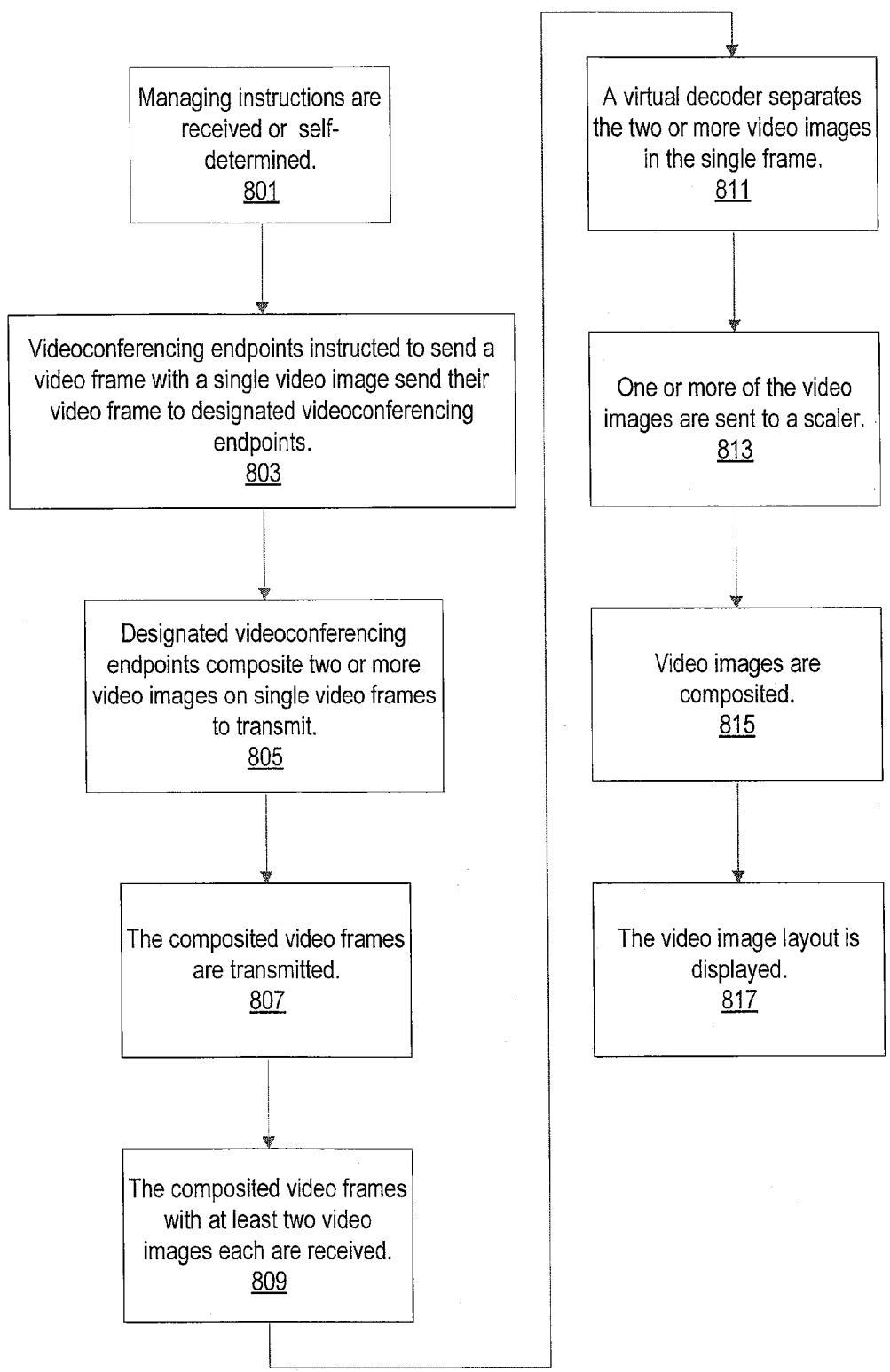
FIG. 8 illustrates a flowchart of a method for conducting a multi-way video conference using the video decoder, according to an embodiment.

FIG. 8 illustrates a flowchart of a method for conducting a multi-way video conference using the video decoder, according to an embodiment. It should be noted that in various embodiments of the methods described below, one or more of the elements described may be performed concurrently, in a different order than shown, or may be omitted entirely. Other additional elements may also be performed as desired.

At 801, managing instructions (e.g., see FIG. 9) for a multi-way video conference may be received from one or more video conferencing endpoints 103 or the managing instructions may be self-determined. The managing instructions may specify which video conferencing endpoints 103 in the multi-way video conference will send which video images and/or combinations of video images to other video conferencing endpoints 103.

At 803, video conferencing endpoints 103 instructed to send at least a video frame 307 with their video image (e.g., a single video image sent as input stream 709) may send their video frame 307 to designated video conferencing endpoints (e.g., to video conferencing endpoint 103*b*).

At 805, after receiving the respective video frames with the single video images, designated video conferencing endpoints may composite two or more video images on single video frames (as instructed) to send to designated video conferencing endpoints. For example, after receiving the video image in input video stream 709 from video conferencing endpoint 103*a*, video conferencing endpoint 103*b* may composite the video image from video conferencing endpoint 103*a* with the local video source image from video conferencing endpoint 103*b* onto a single video frame to send to video conferencing endpoint 103*d* (in input stream 717).

At 807, the composited video frames 307 may be transmitted to designated video conferencing endpoints 103 (e.g., according to specific instructions received by corresponding video conferencing endpoints). In some embodiments, the video stream 300 may be sent and received through a single Internet Protocol (IP) port on each video conferencing endpoint 103.

At 809, the composited video frames 307 with at least two video images each may be received by designated video conferencing endpoints 103. As noted at 805, the at least two video images may be included in a single video frame. For two video images received on the single video frame, a single input decoder 315 may be used prior to sending the video frame to the virtual decoder 317 to separate the composited images.

At 811, virtual decoder 317 may separate the two or more video images included in the single video frame 307.

At 813, one or more of the video images (e.g., separated video images and/or other video images) may be sent to a scaler 513 to scale according to a video image layout (e.g., a video image layout requested by a local video conferencing participant 214 or needed for a video frame 307 to transmit to another video conferencing endpoint 103).

At 815, video images (e.g., separated video images and/or other video images) may be composited. For example, the video images may be composited into the requested video image layout that may include two or more of the local video images and the three received video images. In some embodiments, the video images may be composited into video frames to send to other video conferencing endpoints 103.

At 817, the video image layout may be displayed. In some embodiments, recomposited video frames may be sent to other video conferencing endpoints (e.g., to facilitate the multi-way video conference call).

Figure 9:
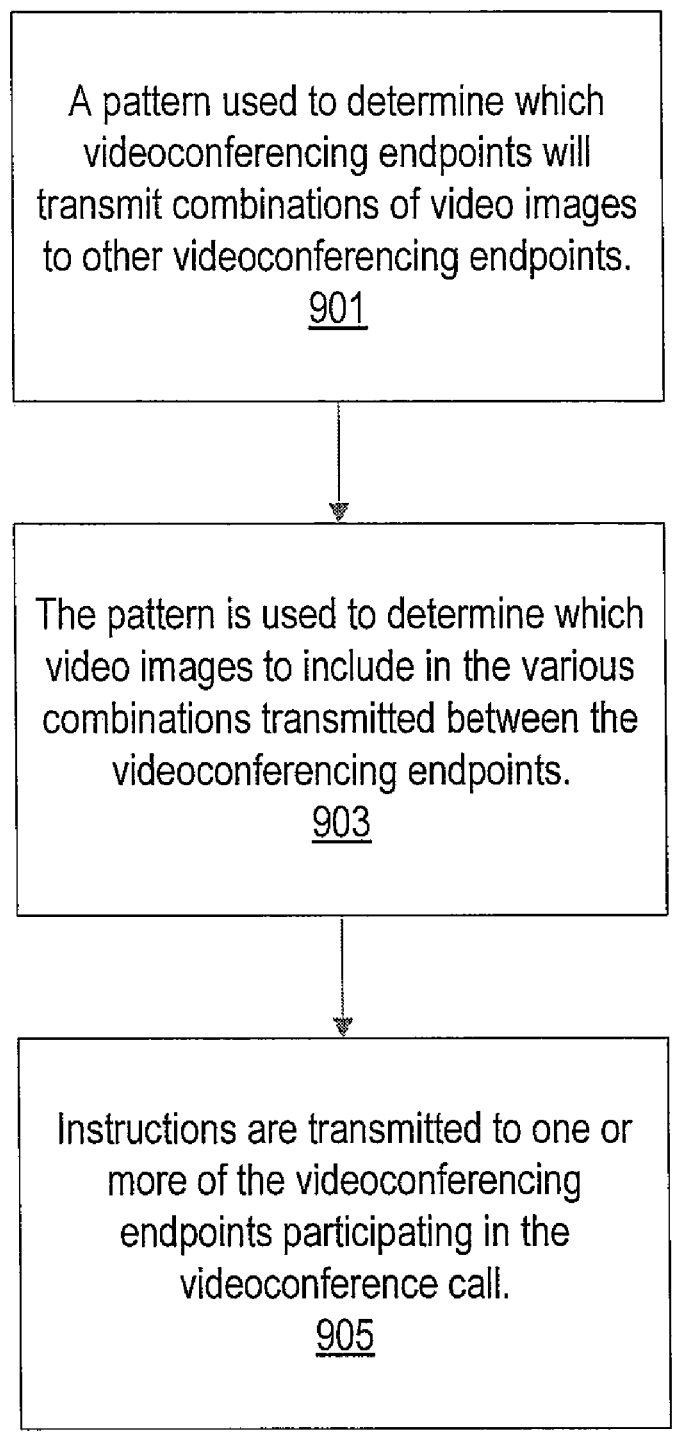
FIG. 9 illustrates a flowchart for managing a multi-way video conference, according to an embodiment.

FIG. 9 illustrates a flowchart for managing a multi-way video conference, according to an embodiment. It should be noted that in various embodiments of the methods described below, one or more of the elements described may be performed concurrently, in a different order than shown, or may be omitted entirely. Other additional elements may also be performed as desired.

At 901, a pattern (e.g., see pattern 700*a* in FIG. 7*a* and 700*b* in FIG. 7*b*) may be used to determine which video conferencing endpoints 103 in the multi-way video conference call will transmit combinations (e.g., see combination 799 in FIG. 7*a*) of video images to other video conferencing endpoints 103 in the multi-way video conference call.

At 903, the pattern may be used to determine which video images to include in the various combinations transmitted between the video conferencing endpoints 103. Various combinations may include at least two video images, each from different video conferencing endpoints 103 (e.g., as seen in FIGS. 7*a*-*b*). The pattern may also include single video images sent by a video conferencing endpoint to other video conferencing endpoints.

At 905, instructions may be transmitted to one or more of the video conferencing endpoints 103 participating in the video conference call. For example, video conferencing endpoint 0 (103*a*) may perform 901 and 903 above and may then transmit the instructions to the other video conferencing endpoints 103 involved in the multi-way video conference call.

Figure 10:
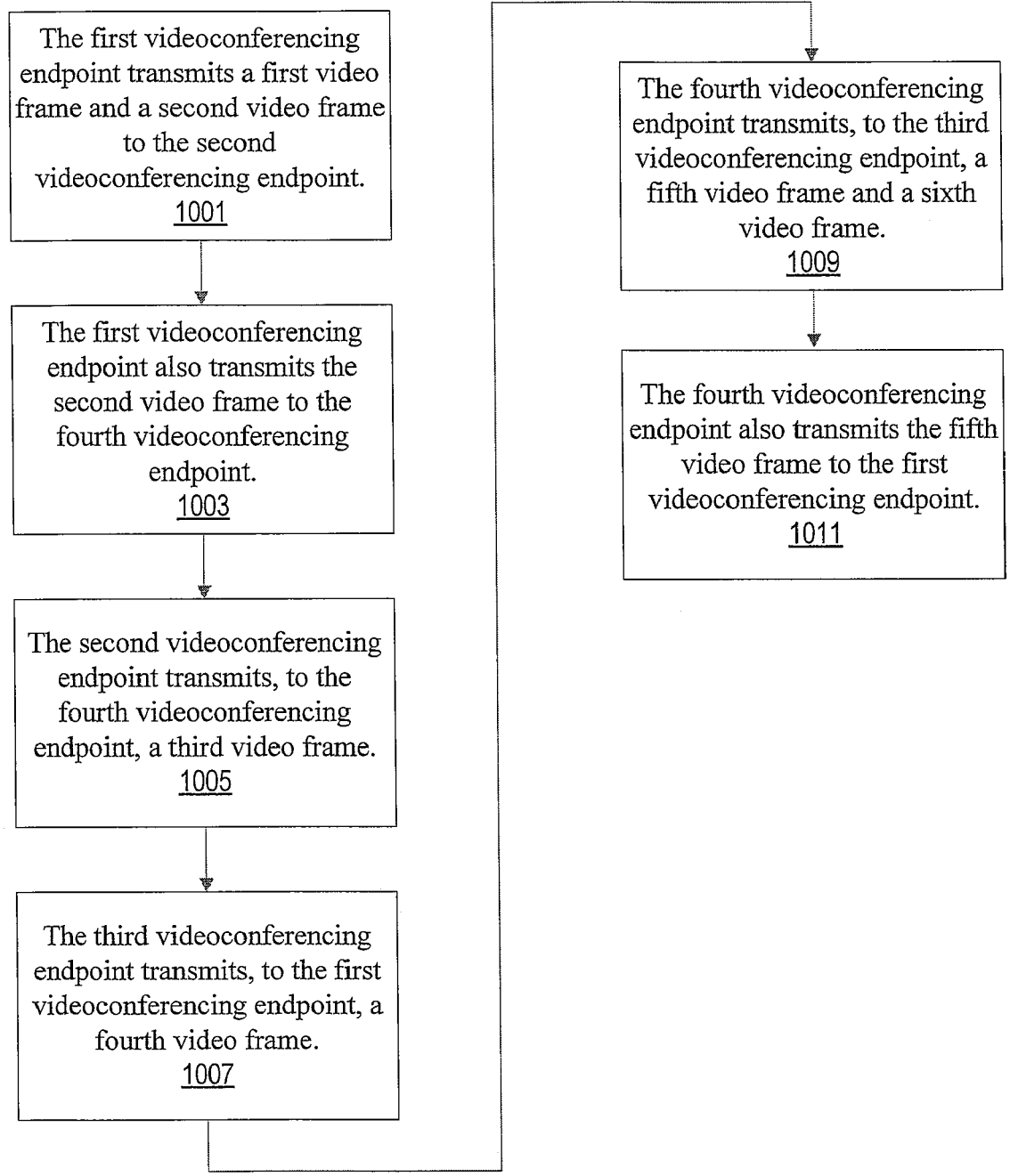
FIG. 10 illustrates a flowchart for implementing a multi-way video conference for four video conferencing endpoints, according to an embodiment.

FIG. 10 illustrates a flowchart for implementing a multi-way video conference for four video conferencing endpoints, according to an embodiment. It should be noted that in various embodiments of the methods described below, one or more of the elements described may be performed concurrently, in a different order than shown, or may be omitted entirely. Other additional elements may also be performed as desired.

At 1001, the first video conferencing endpoint 103*a* may transmit a first video frame in video stream 709 (including video images from the first video conferencing endpoint 103*a*) and a second video frame in video stream 711 (including video images from the third video conferencing endpoint 103*c* and the fourth video conferencing endpoint 103*d*) to the second video conferencing endpoint 103*b*.

At 1003, the first video conferencing endpoint 103*a* may also transmit the second video frame to the fourth video conferencing endpoint 103*d*.

At 1005, the second video conferencing endpoint 103*b* may transmit, to the fourth video conferencing endpoint 103*d*, a third video frame in video stream 717 (including video images from the first video conferencing endpoint 103*a* and the second video conferencing endpoint 103*b*).

At 1007, the third video conferencing endpoint 103*c* may transmit, to the first video conferencing endpoint 103*a*, a fourth video frame in video frame 713 (including video images from the third video conferencing endpoints 103*c* and the fourth video conferencing endpoint 103*d*).

At 1009, the fourth video conferencing endpoint 103*d* may transmit, to the third video conferencing endpoint 103*c*, a fifth video frame in video stream 715 (including video images from the first video conferencing endpoint 103*a* and the second video conferencing endpoint 103*b*) and a sixth video frame in video stream 719 (including video images from the fourth video conferencing endpoint 103*d*).

At 1011, the fourth video conferencing endpoint 103*d* may also transmit the fifth video frame in video stream 715 to the first video conferencing endpoint 103*a*.

In this embodiment, four video conferencing endpoints 103 may participate in a four-way video conference using two or fewer transmissions from each video conference system and two or fewer received transmissions per video conferencing endpoint 103. In some embodiments, the video conferencing endpoints 103 may separate video images out of the received video frames to scale and composite with other images (e.g., from the local camera or from other video sources) to form new video image layouts (e.g., as requested by a local participant at the separate video conferencing endpoints and/or to transmit to other video conferencing endpoints).

In some embodiments, virtual decoders 317 may be implemented in an integrated system in an application programming interface (API). New abstract video sources may be enumerated as source channels. The sources may be configured with a new API that maps the virtual decoder sources to a subsection of the video frames of an incoming real source decoder stream. In some embodiments, the mapping may be changed dynamically but may be configured before a video stream 300 is opened with a virtual decoder source. Scalers may be reserved for the video streams. Only (n−1) virtual decoders 317 may be needed because one of the virtual streams being sent back may be that of the original video conferencing endpoint.

| Node | Receive Node | Receive Virtual Streams | Sources composited in transmitted stream |
| --- | --- | --- | --- |
| 0 | 3 | 1, 2, 3 | 0, 2, 3 |
| 1 | 0 | 0, 2, 3 | 0, 1, 3 |
| 2 | 1 | 0, 1, 3 | 0, 1, 2 |
| 3 | 2 | 0, 1, 2 | 1, 2, 3 |

As seen in the table, four video conferencing endpoints 103 may participate in a four-way call between each other. The video conferencing endpoint 103 may signal the participants 214 and/or each other to determine which video conferencing endpoint 103 will send which inputs. In some embodiments, no single video conferencing endpoint may need to act as an MCU, but instead the MCU duties may be divided among the four video conferencing endpoints 103. As video conferencing endpoints 103 join and/or leave the video conference, the remaining video conferencing endpoints 103 may signal each other changes in assignments in which video conferencing endpoints 103 will send which video streams, etc. In some embodiments, one video conferencing endpoint 103 may be selected to determine which video conferencing endpoints 103 should send which inputs. In some embodiments, multiple video conferencing endpoints 103 may participate in the decision. In some embodiments, one or more of the video conferencing endpoints 103 may broadcast their capabilities (e.g., number of real inputs) to the other video conferencing endpoints 103 to assist in the determination. In some embodiment, composited streams sent by the video conferencing endpoints 103 may be arranged into three 1280 by 240 video images. These may consume the resolution in a 720 p frame with the aspect ratio being corrected at the receiving end. This may be easier for the hardware scalers to handle (the hardware handlers may prefer vertical offsets in the video images). Other video image sizes are also contemplated.

Figure 15:
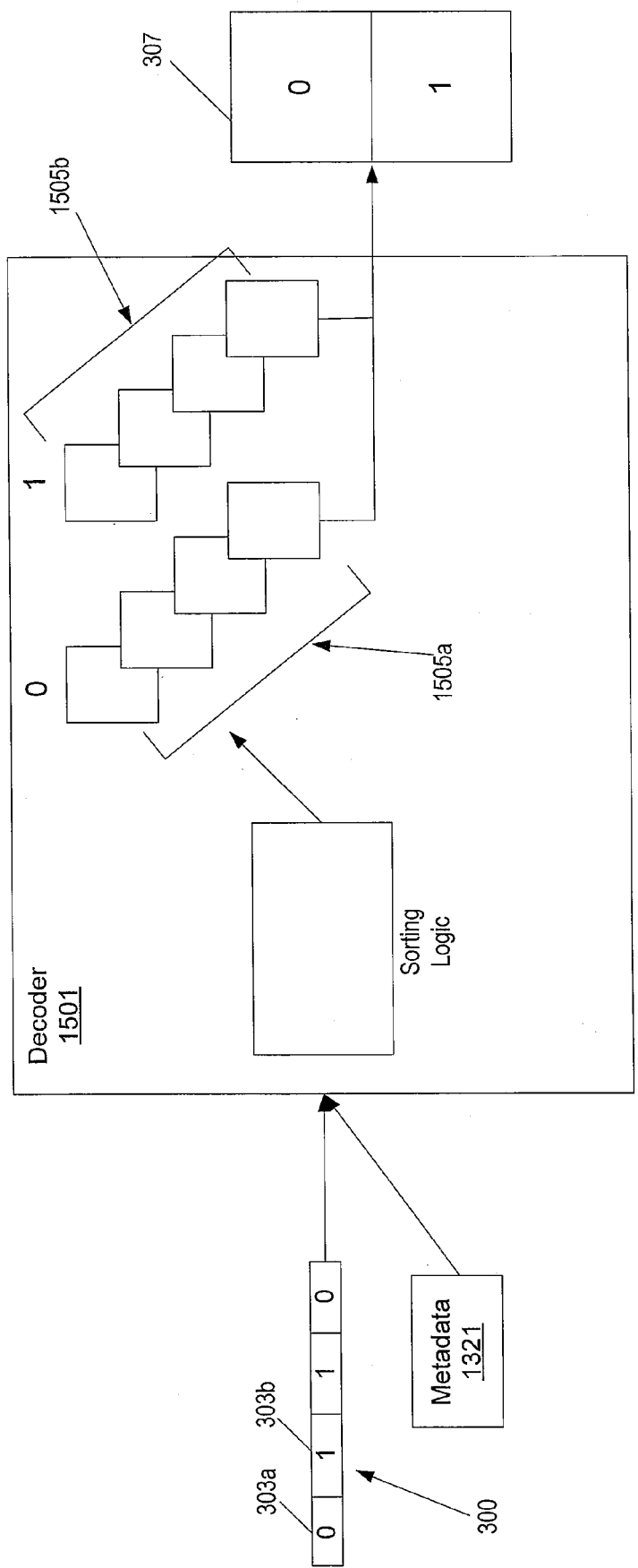
FIG. 15 illustrates a spatially multiplexed output decoder, according to an embodiment.

FIG. 15 illustrates a spatially multiplexed output decoder, according to an embodiment. A video stream 300 may include one or more video packets 303 from two or more sources (e.g., video packet 303a from source 0 and video packet 303b from source 1). In some embodiments, metadata 1321 received with the video stream 300 may be used by the decoder 1501 to organize the video packets into respective buffers (e.g., buffer 1505a for source 0 and buffer 1505b for source 1). In some embodiments, the video stream(s) may be received over two or more ports (each, for example, corresponding to a specific source) and the decoder 1501 may use the respective port as an indicator for the video packets (e.g., instead of the metadata 1321). In some embodiments, the video stream(s) may be received over one port. A video frame 307 including a source 0 image spatially multiplexed with a source 1 image may be outputted (e.g., to a separate buffer). The video images may then be demultiplexed in other parts of the system (e.g., in virtual decoder 317) using information provided about the video frame 307. In this way, the virtual decoder 317 may demultiplex multiple video sources from a single transmitted video stream 300. In some embodiments, the video sources may be time multiplexed as they enter the decoder 1501 and may leave the decoder 1501 in a spatially multiplexed format. For example, video frame 307 leaving the decoder 1501 may have a video layout 405b with stacked 1280 by 720 pixel images. These stacked images may be disassembled as needed to assemble different composite layouts for display and/or to transmit to a different endpoint for facilitating a multi-way conference.

Figure 16:
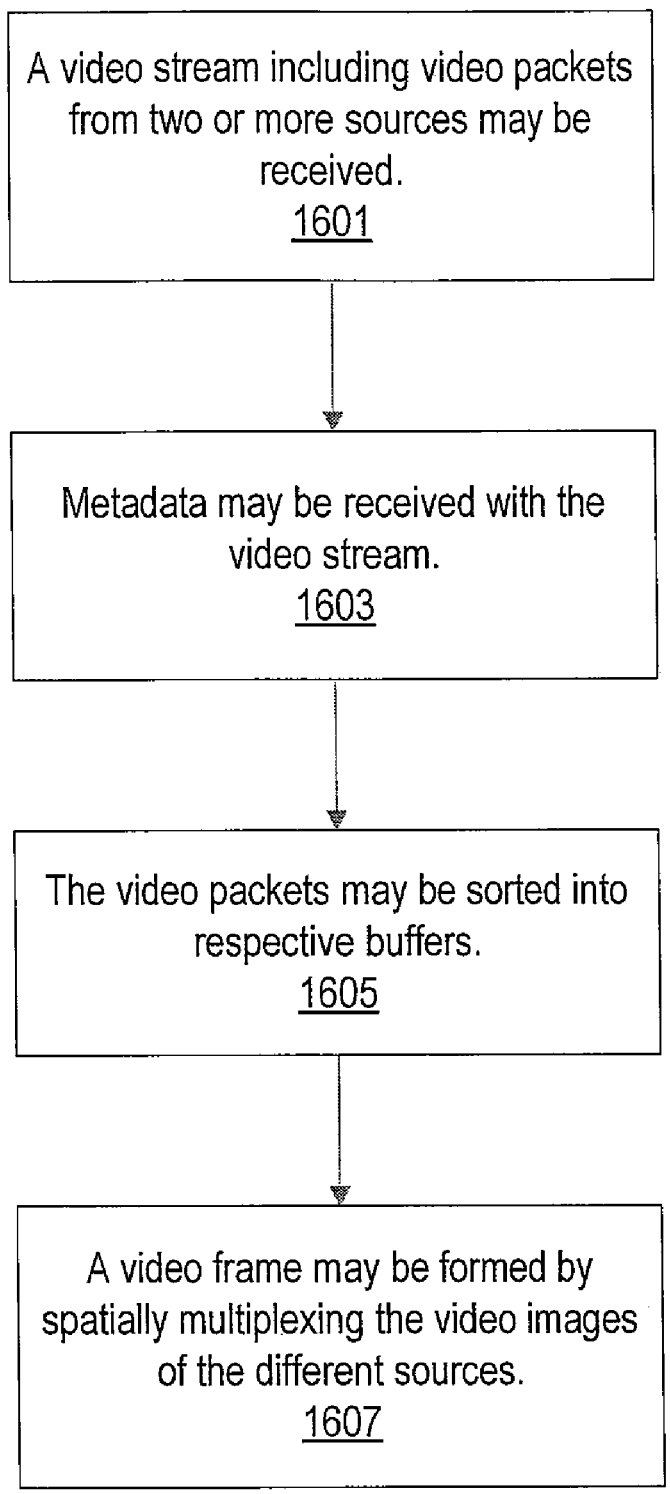
FIG. 16 illustrates a flowchart for implementing a spatially multiplexed output decoder, according to an embodiment.

FIG. 16 illustrates a flowchart for implementing a spatially multiplexed output decoder, according to an embodiment. It should be noted that in various embodiments of the methods described below, one or more of the elements described may be performed concurrently, in a different order than shown, or may be omitted entirely. Other additional elements may also be performed as desired.

At 1601, a video stream including video packets from two or more sources may be received. In some embodiments, the video packets of the video stream may be time multiplexed.

At 1603, metadata may be received with the video stream. In some embodiments, metadata 1321 received with the video stream 300 may be used by the decoder 1501 to organize the video packets into respective buffers (e.g., buffer 1505a for source 0 and buffer 1505b for source 1). For example, the metadata 1321 may include identification information for the video packets.

At 1605, the video packets may be sorted into respective buffers. For example, a different buffer may be used to collect the video packets for a video image for each video packet source.

At 1607, a video frame may be formed by spatially multiplexing the video images of the different sources (e.g., see video frame 307 in FIG. 15). In some embodiments, metadata may be generated for the composite video frame that includes coordinate information for the video images in the composite video frame.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RDRAM), etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A video conferencing endpoint operable to perform multi-way video conferencing, the video conferencing endpoint comprising:
   a video input operable to receive two or more first video images in a single video frame of a video stream;
   a decoder coupled to the video input for decoding the received video frame;
   a processor coupled to the decoder and operable to implement virtual decoder program instructions operable to:
      receive the video frame from the decoder comprising the two or more first video images; and
      separate the two or more first video images into separate video images, wherein separating the two or more first video images is performed using coordinate information received with the received video frame;
   wherein the video conferencing endpoint is a first video conferencing endpoint and wherein the first video conferencing endpoint is further operable to transmit an output video frame to a second video conferencing endpoint; wherein the output video frame comprises two or more second video images, and wherein the two or more second video images comprise at least one of the separated video images.

2. The video conferencing endpoint of claim 1, wherein the output video frame comprises video images from at least two video conferencing endpoints.

3. The video conferencing endpoint of claim 1, wherein the video conferencing endpoint is further operable to generate coordinate information for the two or more second video images in the output video frame and transmit the coordinate information for the two or more second video images with the output frame to the second video conferencing endpoint.

4. The video conferencing endpoint of claim 1, further comprising:
   a scaler; and
   a compositor coupled to the scaler;
   wherein the first video conferencing endpoint is further operable to provide at least one of the separate video images to the scaler and/or compositor to arrange the at least one separate video image into a video image layout.

5. The video conferencing endpoint of claim 1, wherein the program instructions are further operable to scale one or more of the separate video images.

6. The video conferencing endpoint of claim 1, wherein the first video conferencing endpoint is further operable to composite a video image layout comprising one or more of the separate video images.

7. The video conferencing endpoint of claim 6, wherein the first video conferencing endpoint is further operable to display the video image layout.

8. The video conferencing endpoint of claim 6, wherein a layout for the video image layout is selected by a local video conferencing participant using the first video conferencing endpoint.

9. The video conferencing endpoint of claim 1, wherein separating the two or more first video images is performed by separating the two or more first video images at boundaries of the two or more first video images, wherein the boundaries are identified using the coordinate information received with the received video frame.

10. The video conferencing endpoint of claim 1,
    wherein at least one of the separate video images is from previous local video from the second video conferencing endpoint; and
    wherein the first video conferencing endpoint is further operable to generate a new video frame that comprises at least one of the separate video images and at least one video image from current local video of the first video conferencing endpoint.

11. A computer implemented method, comprising:
    receiving a first video frame, comprising two or more first video images at a first video conferencing endpoint, wherein the two or more first video images are from at least two different video conferencing endpoints;
    separating the two or more first video images in the first video frame into two or more separate video images, wherein separating the two or more video images is performed using coordinate information received with the received video frame;
    compositing two or more second video images into a second video frame, wherein at least one of the two or more second video images is at least one of the two or more separate video images;
    transmitting the second video frame to a second video conferencing endpoint; and
    wherein the first video conferencing endpoint and the second video conferencing endpoint are operable to participate in a multi-way video conference between at least four total video conferencing endpoints without using an MCU.

12. The computer implemented method of claim 11, wherein the second video frame comprises video images from at least two video conferencing endpoints.

13. The computer implemented method of claim 11,
    wherein the first video conferencing endpoint and the second video conferencing endpoint are communicatively coupled to a third video conferencing endpoint and a fourth video conferencing endpoint;
    wherein the first video conferencing endpoint is operable to transmit, to the second video conferencing endpoint, a first output video frame comprising video images from the first video conferencing endpoint and a second output video frame comprising video images from the third video conferencing endpoint and the fourth video conferencing endpoint;
    wherein the first video conferencing endpoint is further operable to transmit the second output video frame to the fourth video conferencing endpoint;
    wherein the second video conferencing endpoint is operable to transmit, to the fourth video conferencing endpoint, a third output video frame comprising video images from the first video conferencing endpoint and the second video conferencing endpoint;
    wherein the third video conferencing endpoint is operable to transmit, to the first video conferencing endpoint, a fourth output video frame comprising video images from the third video conferencing endpoint and the fourth video conferencing endpoint;

wherein the fourth video conferencing endpoint is operable to transmit, to the third video conferencing endpoint, a fifth output video frame comprising video images from the first video conferencing endpoint and the second video conferencing endpoint and a sixth output video frame comprising video images from the fourth video conferencing endpoint; and wherein the fourth video conferencing endpoint is further operable to transmit the fifth output video frame to the first video conferencing endpoint.

14. The computer implemented method of claim 11, wherein the first video conferencing endpoint is further operable to composite third video images into a video image layout, wherein at least one of the third video images is at least one of the two or more separate video images.

15. The computer implemented method of claim 11, further comprising scaling two or more second video images.

16. The computer implemented method of claim 11, wherein the second video conferencing endpoint is further operable to composite fourth video images into a video image layout, wherein at least one of the fourth video images is at least one of the two or more separate video images.

17. The computer implemented method of claim 16, further comprising displaying the video image layout.

18. The computer implemented method of claim 16, further comprising selecting a layout for the video image layout by a participant using the second video conferencing endpoint.

19. The computer implemented method of claim 11, wherein separating the two or more first video images is performed by separating the two or more first video images at boundaries of the two or more first video images, wherein the boundaries are identified through the coordinate information received with the first video frame.

20. The computer implemented method of claim 11,
wherein at least one of the two or more separate video images is from previous local video from the second video conferencing endpoints;
wherein the first video conferencing endpoint is further operable to generate a new video frame that comprises at least one of the two or more separate video images and at least one video image from current local video of the first video conferencing endpoint.

* * * * *